United States Patent
Iwamura et al.

(10) Patent No.: US 12,247,766 B2
(45) Date of Patent: Mar. 11, 2025

(54) HEAT GENERATING METHOD

(71) Applicant: CLEAN PLANET INC., Tokyo (JP)

(72) Inventors: Yasuhiro Iwamura, Miyagi (JP); Takehiko Ito, Tokyo (JP); Hideki Yoshino, Tokyo (JP)

(73) Assignee: CLEAN PLANET Inc., Tokyo (JP)

( * ) Notice: Subject to any disclaimer, the term of this patent is extended or adjusted under 35 U.S.C. 154(b) by 340 days.

(21) Appl. No.: 18/000,126

(22) PCT Filed: Jan. 21, 2022

(86) PCT No.: PCT/JP2022/002280
§ 371 (c)(1),
(2) Date: Nov. 28, 2022

(87) PCT Pub. No.: WO2022/158581
PCT Pub. Date: Jul. 28, 2022

(65) Prior Publication Data
US 2023/0194128 A1    Jun. 22, 2023

(30) Foreign Application Priority Data

Jan. 22, 2021    (JP) ................................ 2021-009154

(51) Int. Cl.
*F24V 30/00*    (2018.01)
*F01K 3/18*    (2006.01)

(52) U.S. Cl.
CPC ............. *F24V 30/00* (2018.05); *F01K 3/188* (2013.01)

(58) Field of Classification Search
CPC ........... F24V 30/00; F01K 3/188; Y02E 60/32
(Continued)

(56) References Cited

U.S. PATENT DOCUMENTS 11,971,199 B2 *    4/2024    Iwamura ............... C01B 3/0026

FOREIGN PATENT DOCUMENTS

| JP | H02-280829 A | 11/1990 |
|---|---|---|
| JP | H06-221687 A | 8/1994 |

(Continued)

OTHER PUBLICATIONS

Kitamura et al. "Excess heat evolution from nanocomposite samples under exposure to hydrogen isotope gases." sciencedirect.com. pp. 16187-16200. Jul. 24, 2018. (14 pages).

(Continued)

*Primary Examiner* — Vivek K Shirsat
(74) *Attorney, Agent, or Firm* — Osha Bergman Watanabe & Burton LLP

(57) ABSTRACT

A heat generating method includes: heating, with a heater, a heat generating element and causing a first heat generating reaction in which the heat generating element generates heat with a first heat generation amount and triggering a second heat generating reaction in which the heat generating element generates heat with a second heat generation amount larger than the first heat generation amount, by imparting a perturbation to an input power to be applied to the heater in a state where the first heat generating reaction is occurring. The heat generating element includes a base made of a hydrogen storage metal, a hydrogen storage alloy, or a proton conductor, and a multilayer film provided on a surface of the base, with a stacked configuration of a first layer and a second layer made of different materials and both having a thickness of less than 1,000 nm.

7 Claims, 19 Drawing Sheets

(58) Field of Classification Search
USPC .................................................... 126/263.01
See application file for complete search history.

(56) References Cited

FOREIGN PATENT DOCUMENTS

| JP | H06-221689 A | 8/1994 |
| JP | WO2018/230447 A1 | 6/2019 |
| JP | WO2020/122098 A1 | 2/2021 |

OTHER PUBLICATIONS

International Search Report issued in corresponding International Application No. PCT/JP2022/002280 mailed Mar. 15, 2022 (5 pages).
Written Opinion issued in corresponding International Application No. PCT/JP2022/002280 mailed Mar. 15, 2022 (3 pages).

* cited by examiner

HEAT GENERATING METHOD

TECHNICAL FIELD

The present invention relates to a heat generating method.

BACKGROUND ART

In recent years, a heat generation phenomenon in which heat is generated by occluding and discharging hydrogen using a nanostructure formed of a hydrogen storage metal or a hydrogen storage alloy is reported (see, for example, Non-PTL 1). This heat generation phenomenon can produce a larger amount of thermal energy than a chemical reaction, and is thus expected to be used as an effective heat source or power supply. In addition, from the viewpoint of environmental problems, an arrival of a hydrogen society is expected, and there is a demand for obtaining hydrogen energy having a high energy density with safety by using the above-mentioned heat generation phenomenon.

CITATION LIST

Non-Patent Literature

Non-PTL 1: A. Kitamura, A. Takahashi, K. Takahashi, R. Seto, T. Hatano, Y. Iwamura, T. Itoh, J. Kasagi, M. Nakamura, M. Uchimura, H. Takahashi, S. Sumitomo, T. Hioki, T. Motohiro, Y. Furuyama, M. Kishida, H. Matsune, "Excess heat evolution from nanocomposite samples under exposure to hydrogen isotope gases", International Journal of Hydrogen Energy 43 (2018) 16187-16200.

SUMMARY OF INVENTION

Technical Problem

It is known that a heat generating reaction of a nanostructure can be controlled according to a type of a metal constituting the nanostructure and a temperature at which the nanostructure is heated. During the heat generating reaction, in order to further trigger the reaction, it is necessary to apply a large amount of energy to a heat generating element. Therefore, from the viewpoint of necessity of reaction control, there is a strong demand for a method for triggering a heat generating reaction without applying a large amount of energy to a heat generating element during the heat generating reaction.

Accordingly, an object of the invention is to provide a heat generating method for triggering a heat generating reaction of a heat generating element.

Solution to Problem

A heat generating method according to the invention includes: a heat generating step of heating, with a heater, a heat generating element and causing a first heat generating reaction in which the heat generating element generates heat with a first heat generation amount, the heat generating element including a base made of a hydrogen storage metal, a hydrogen storage alloy, or a proton conductor, and a multilayer film provided on a surface of the base, and the multilayer film having a stacked configuration including a first layer made of a hydrogen storage metal or a hydrogen storage alloy and having a thickness of less than 1,000 nm, and a second layer made of a hydrogen storage metal or a hydrogen storage alloy, which is different from that of the first layer, or ceramics and having a thickness of less than 1,000 nm; and a trigger step of imparting a perturbation to input power to be applied to the heater in a state where the first heat generating reaction is occurring to trigger a second heat generating reaction in which the heat generating element generates heat with a second heat generation amount larger than the first heat generation amount.

Advantageous Effects of Invention

According to the invention, the heat generating reaction of the heat generating element can be triggered without applying a large amount of energy to the heat generating element during the heat generating reaction.

DESCRIPTION OF EMBODIMENTS

Figure 1:
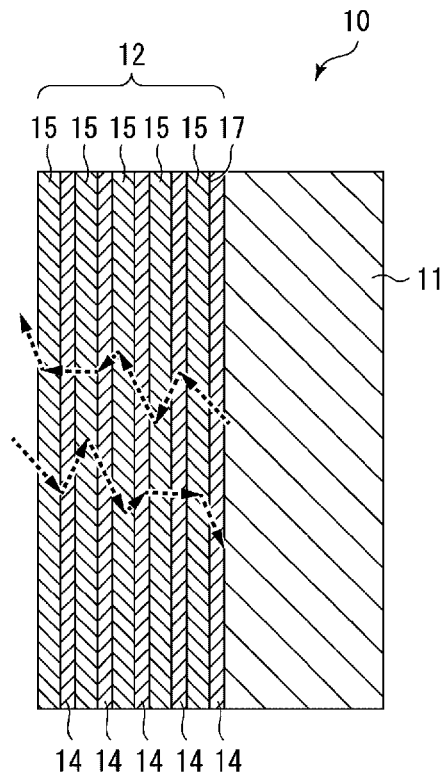
FIG. 1 is a cross-sectional view showing a configuration of a heat generating element according to a first embodiment used in a heat generating method according to the invention.

Hereinafter, embodiments of the invention will be described with reference to the drawings. In the following description and the drawings, common components are denoted by common reference numerals. The description of the components denoted by the same reference numerals will be omitted as appropriate.

[Heat Generating Element]

In a heat generating method according to the invention, a heat generating element that generates heat by occluding and discharging hydrogen contained in a hydrogen-based gas is used. Details of a mechanism by which the heat generating element generates heat will be described later. When the heat generating element is heated by a heater, a temperature of the heat generating element is increased to a temperature equal to or higher than a temperature at which the heat generating element is heated by the heater. The heat generated by the heat generating element whose temperature is increased is referred to as excess heat. The hydrogen-based gas is a gas containing isotopes of hydrogen. As the hydrogen-based gas, at least one of a deuterium gas and a protium gas is used. The protium gas contains a mixture of naturally occurring protium and deuterium, that is, a mixture in which an abundance ratio of protium is 99.985% and an abundance ratio of deuterium is 0.015%. In the following description, when protium and deuterium are not distinguished from each other, both are referred to as "hydrogen".

FIG. 1 is a cross-sectional view showing a configuration of a heat generating element 10 according to a first embodiment used in the heat generating method according to the invention. The heat generating element 10 includes a base 11 made of a hydrogen storage metal, a hydrogen storage alloy, or a proton conductor, and a multilayer film 12 provided on a surface of the base 11. Examples of the hydrogen storage metal include Ni, Pd, V, Nb, Ta, and Ti. Examples of the hydrogen storage alloy include $LaNi_5$, $CaCu_5$, $MgZn_2$, $ZrNi_2$, $ZrCr_2$, TiFe, TiCo, $Mg_2Ni$, and $Mg_2Cu$. Examples of the proton conductor include a $BaCeO_3$-based (for example, $Ba(Ce_{0.95}Y_{0.05})O_{3-\delta}$) conductor, a $SrCeO_3$-based (for example, $Sr(Ce_{.95}Y_{0.05})O_{3-\delta}$) conductor, a $CaZrO_3$-based (for example, $CaZr_{0.95}Y_{0.05})O_{3-\alpha}$) conductor, a $SrZrO_3$-based (for example, $SrZr_{0.9}Y_{0.1}O_{3-\alpha}$) conductor, $\beta Al_2O_3$, and $\beta Ga_2O_3$.

The base 11 may be formed of a porous body or a hydrogen permeable film. The porous body has pores having a size allowing the hydrogen-based gas to permeate therethrough. The porous body is formed of a metal, a non-metal, ceramics, or the like. The porous body is preferably formed of a material that does not inhibit a reaction between the hydrogen-based gas and the multilayer film 12. The hydrogen permeable film is formed of, for example, a hydrogen storage metal or a hydrogen storage alloy. The hydrogen permeable film includes a film having a mesh-shaped sheet.

The multilayer film 12 has a stacked configuration including a first layer 14 made of a hydrogen storage metal or a hydrogen storage alloy and having a thickness of less than 1,000 nm, and a second layer 15 made of a hydrogen storage metal or a hydrogen storage alloy, which is different from that of the first layer 14, or ceramics and having a thickness of less than 1,000 nm. An interface between the base 11 and the first layer 14 and an interface between the first layer 14 and the second layer 15 are heterogeneous material interfaces 17. Although the multilayer film 12 is provided on a front surface of the base 11 in FIG. 1, the multilayer film 12 may be provided on a back surface of the base 11 or on both surfaces of the base 11.

The first layer 14 is formed of, for example, any one of Ni, Pd, Cu, Mn, Cr, Fe, Mg, Co, and an alloy thereof. The alloy for forming the first layer 14 is preferably an alloy made of two or more of Ni, Pd, Cu, Mn, Cr, Fe, Mg, and Co. The alloy for forming the first layer 14 may be an alloy obtained by adding an additive element to Ni, Pd, Cu, Mn, Cr, Fe, Mg, or Co.

The second layer 15 is formed of, for example, any one of Ni, Pd, Cu, Mn, Cr, Fe, Mg, Co, an alloy thereof, and SiC. The alloy for forming the second layer 15 is preferably an alloy made of two or more of Ni, Pd, Cu, Mn, Cr, Fe, Mg, and Co. The alloy for forming the second layer 15 may be an alloy obtained by adding an additive element to Ni, Pd, Cu, Mn, Cr, Fe, Mg, or Co.

A combination of the first layer 14 and the second layer 15 is preferably Pd—Ni, Ni—Cu, Ni—Cr, Ni—Fe, Ni—Mg, or Ni—Co when types of elements are expressed as "first layer 14-second layer 15". When the second layer 15 is made of ceramics, the "first layer 14-second layer 15" is preferably Ni—SiC.

The thickness of the first layer 14 and the thickness of the second layer 15 are each preferably less than 1,000 nm. When the thickness of each of the first layer 14 and the second layer 15 is 1,000 nm or more, it is difficult for hydrogen to permeate through the multilayer film 12. When the thickness of each of the first layer 14 and the second layer 15 is less than 1,000 nm, a nanostructure that does not exhibit bulk properties can be maintained. The thickness of each of the first layer 14 and the second layer 15 is more preferably less than 500 nm. When the thickness of each of the first layer 14 and the second layer 15 is less than 500 nm, a nanostructure that does not exhibit bulk properties completely can be maintained.

In FIG. 1, the multilayer film 12 has a configuration in which the first layer 14 and the second layer 15 are alternately stacked in this order on the surface of the base 11, but not limited thereto. The multilayer film 12 may have a configuration in which the second layer 15 and the first layer 14 are alternately stacked in this order on the surface of the base 11. The number of layers of the first layer 14 and the second layer 15 may be changed as appropriate. The multilayer film 12 may include one or more first layers 14 and one or more second layers 15, and may be formed with one or more heterogeneous material interfaces 17.

Figure 2:
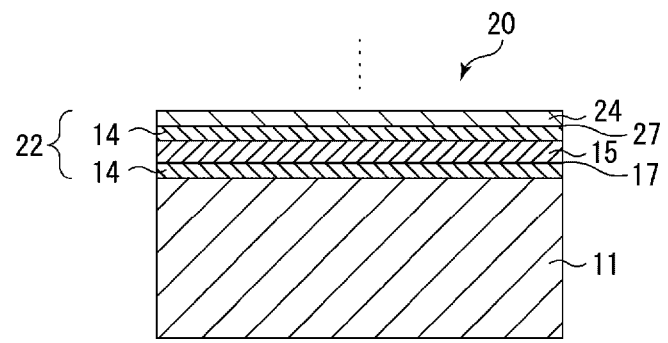
FIG. 2 is a cross-sectional view showing a configuration of a heat generating element according to a second embodiment used in the heat generating method according to the invention.

FIG. 2 is a cross-sectional view showing a configuration of a heat generating element 20 according to a second embodiment used in the heat generating method according to the invention. The heat generating element 20 includes the base 11 and a multilayer film 22 provided on the surface of the base 11. The multilayer film 22 has a stacked configuration including the first layer 14, the second layer 15, and a third layer 24 made of a hydrogen storage metal, a hydrogen storage alloy, or ceramics different from those of the first layer 14 and the second layer 15 and having a thickness of less than 1,000 nm. The description of the base 11, the first layer 14, and the second layer 15 will be omitted. An interface between the first layer 14 and the third layer 24 is a heterogeneous material interface 27. Similar to the heterogeneous material interface 17, the heterogeneous material interface 27 allows hydrogen atoms to permeate therethrough. Although the multilayer film 22 is provided on the front surface of the base 11 in FIG. 2, the multilayer film 22 may be provided on the back surface of the base 11 or on both surfaces of the base 11.

The third layer 24 is formed of, for example, any one of Ni, Pd, Cu, Cr, Fe, Mg, Co, an alloy thereof, SiC, CaO, $Y_2O_3$, TiC, $LaB_6$, SrO, and BaO. The alloy for forming the third layer 24 is preferably an alloy made of two or more of Ni, Pd, Cu, Cr, Fe, Mg, and Co. The alloy for forming the third layer 24 may be an alloy obtained by adding an additive element to Ni, Pd, Cu, Cr, Fe, Mg, or Co.

In particular, the third layer 24 is preferably formed of any one of CaO, $Y_2O_3$, TiC, $LaB_6$, SrO, and BaO. In the heat generating element 20 having the third layer 24 formed of any one of CaO, $Y_2O_3$, TiC, $LaB_6$, SrO, and BaO, an occluding amount of hydrogen is increased, an amount of hydrogen permeating through the heterogeneous material interface 17 and the heterogeneous material interface 27 is increased, and a high output of excess heat can be achieved. The thickness of the third layer 24 formed of any one of CaO, $Y_2O_3$, TiC, $LaB_6$, SrO, and BaO is preferably 10 nm or less. Accordingly, the hydrogen atoms can easily permeate through the multilayer film 22. The third layer 24 formed of any one of CaO, $Y_2O_3$, TiC, $LaB_6$, SrO, and BaO may be formed in an island shape instead of being formed in a complete film shape. The first layer 14 and the third layer 24 are preferably continuously formed in a vacuum state. Accordingly, between the first layer 14 and the third layer 24, no natural oxide film is formed and only the heterogeneous material interface 27 is formed.

A combination of the first layer 14, the second layer 15, and the third layer 24 is preferably Pd—CaO—Ni, Pd—$Y_2O_3$—Ni, Pd—TiC—Ni, Pd—$LaB_6$—Ni, Ni—CaO—Cu, Ni—$Y_2O_3$—Cu, Ni—TiC—Cu, Ni—$LaB_6$—Cu, Ni—Co—Cu, Ni—CaO—Cr, Ni—$Y_2O_3$—Cr, Ni—TiC—Cr, Ni—$LaB_6$—Cr, Ni—CaO—Fe, Ni—$Y_2O_3$—Fe, Ni—TiC—Fe, Ni—$LaB_6$—Fe, Ni—Cr—Fe, Ni—CaO—Mg, Ni—$Y_2O_3$—Mg, Ni—TiC—Mg, Ni—$LaB_6$—Mg, Ni—CaO—Co, Ni—$Y_2O_3$—Co, Ni—TiC—Co, Ni—$LaB_6$—Co, Ni—CaO—SiC, Ni—$Y_2O_3$—SiC, Ni—TiC—SiC, or Ni—$LaB_6$—SiC when types of elements are expressed as "first layer 14-third layer 24-second layer 15".

In FIG. 2, the multilayer film 22 has a configuration in which the first layer 14, the second layer 15, the first layer 14, and the third layer 24 are sequentially stacked on the surface of the base 11, but not limited thereto. The multilayer film 22 may have a configuration in which the second layer 15 and the third layer 24 are disposed in any order on the surface of the base 11, and the first layer 14 is provided between the second layer 15 and the third layer 24. For example, the multilayer film 22 may have a configuration in which the first layer 14, the third layer 24, the first layer 14, and the second layer 15 are sequentially stacked on the surface of the base 11. The number of layers of the first layer 14, the second layer 15, and the third layer 24 may be changed as appropriate. The multilayer film 22 may include one or more third layers 24, and may be formed with one or more heterogeneous material interfaces 27.

Figure 3:
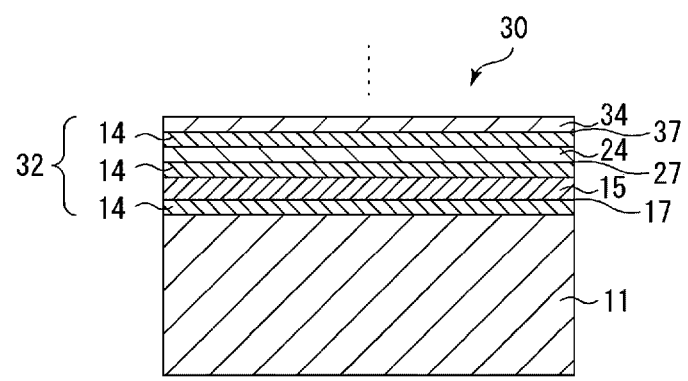
FIG. 3 is a cross-sectional view showing a configuration of a heat generating element according to a third embodiment used in the heat generating method according to the invention.

FIG. 3 is a cross-sectional view showing a configuration of a heat generating element 30 according to a third embodiment used in the heat generating method according to the invention. The heat generating element 30 includes the base 11 and a multilayer film 32 provided on the surface of the base 11. The multilayer film 32 has a stacked configuration including the first layer 14, the second layer 15, the third layer 24, and a fourth layer 34 made of a hydrogen storage metal, a hydrogen storage alloy, or ceramics different from those of the first layer 14, the second layer 15, and the third layer 24 and having a thickness of less than 1,000 nm. The description of the base 11, the first layer 14, the second layer 15, and the third layer 24 will be omitted. An interface between the first layer 14 and the fourth layer 34 is a heterogeneous material interface 37. Similar to the heterogeneous material interface 17 and the heterogeneous material interface 27, the heterogeneous material interface 37 allows hydrogen atoms to permeate therethrough. Although the multilayer film 32 is provided on the front surface of the base 11 in FIG. 3, the multilayer film 32 may be provided on the back surface of the base 11 or on both surfaces of the base 11.

The fourth layer 34 is formed of, for example, any one of Ni, Pd, Cu, Cr, Fe, Mg, Co, an alloy thereof, SiC, CaO, $Y_2O_3$, TiC, $LaB_6$, SrO, and BaO. The alloy for forming the fourth layer 34 is preferably an alloy made of two or more of Ni, Pd, Cu, Cr, Fe, Mg, and Co. The alloy for forming the fourth layer 34 may be an alloy obtained by adding an additive element to Ni, Pd, Cu, Cr, Fe, Mg, or Co.

In particular, the fourth layer 34 is preferably formed of any one of CaO, $Y_2O_3$, TiC, $LaB_6$, SrO, and BaO. In the heat generating element 30 having the fourth layer 34 formed of any one of CaO, $Y_2O_3$, TiC, $LaB_6$, SrO, and BaO, an occluding amount of hydrogen is increased, an amount of hydrogen permeating through the heterogeneous material interface 17, the heterogeneous material interface 27, and the heterogeneous material interface 37 is increased, and a high output of excess heat can be achieved. The thickness of the fourth layer 34 formed of any one of CaO, $Y_2O_3$, TiC, $LaB_6$, SrO, and BaO is preferably 10 nm or less. Accordingly, the hydrogen atoms can easily permeate through the multilayer film 32. The fourth layer 34 formed of any one of CaO, $Y_2O_3$, TiC, $LaB_6$, SrO, and BaO may be formed in an island shape instead of being formed in a complete film shape. The first layer 14 and the fourth layer 34 are preferably continuously formed in a vacuum state. Accordingly, between the first layer 14 and the fourth layer 34, no natural oxide film is formed and only the heterogeneous material interface 37 is formed.

A combination of the first layer 14, the second layer 15, the third layer 24, and the fourth layer 34 is preferably Ni—CaO—Cr—Fe, Ni—$Y_2O_3$—Cr—Fe, Ni—TiC—Cr—Fe, or Ni—$LaB_6$—Cr—Fe when types of elements are expressed as "first layer 14-fourth layer 34-third layer 24-second layer 15".

In FIG. 3, the multilayer film 32 has a configuration in which the first layer 14, the second layer 15, the first layer 14, the third layer 24, the first layer 14, and the fourth layer 34 are sequentially stacked on the surface of the base 11, but not limited thereto. The multilayer film 32 may have a configuration in which the second layer 15, the third layer 24, and the fourth layer 34 are disposed in any order on the surface of the base 11, and the first layer 14 is provided between each two of the second layer 15, the third layer 24, and the fourth layer 34. For example, the multilayer film 32 may have a configuration in which the first layer 14, the fourth layer 34, the first layer 14, the third layer 24, the first layer 14, and the second layer 15 are sequentially stacked on the surface of the base 11. The number of layers of the first layer 14, the second layer 15, the third layer 24, and the fourth layer 34 may be changed as appropriate. The multilayer film 32 may include one or more fourth layers 34, and may be formed with one or more heterogeneous material interfaces 37.

A mechanism by which the heat generating element generates excess heat will be described. By supplying the hydrogen-based gas to the heat generating element, hydrogen is occluded at a high density in the base and the multilayer film of the heat generating element. Even when the supply of the hydrogen-based gas is stopped, the heat generating element can maintain a state where hydrogen is occluded in the base and the multilayer film. When the heat generating element is heated by the heater, hydrogen occluded in the base and the multilayer film is quantum-diffused while hopping. It is known that hydrogen is light and hops in a manner of quantum diffusion at a site (octahedral site or tetrahedral site) occupied by hydrogen of a certain substance A and substance B. The heat generating element generates heat (generates excess heat) in a process in which hydrogen permeates or diffuses through the heterogeneous material interface of the multilayer film in a manner of quantum diffusion.

Figure 4:
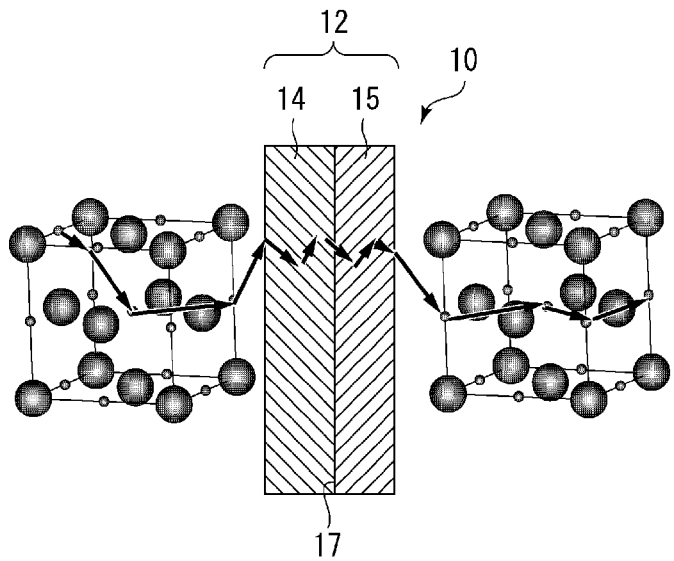
FIG. 4 is a diagram illustrating a mechanism by which the heat generating element generates excess heat.

FIG. 4 shows a state where hydrogen atoms in a metal lattice of the first layer 14 permeate through the heterogeneous material interface 17 and move to a metal lattice of the second layer 15 in the heat generating element 10 having the first layer 14 and the second layer 15 each formed of a hydrogen storage metal having a face-centered cubic structure. The heat generating element 10 generates excess heat in a process in which hydrogen permeates or diffuses through the heterogeneous material interface 17 of the multilayer film 12 in a manner of quantum diffusion. Although not shown, the heat generating element 20 generates excess heat in a process in which hydrogen permeates or diffuses through the heterogeneous material interface 17 and the heterogeneous material interface 27 of the multilayer film 22 in a manner of quantum diffusion (see FIG. 2). The heat generating element 30 generates excess heat in a process in which hydrogen permeates or diffuses through the heterogeneous material interface 17, the heterogeneous material interface 27, and the heterogeneous material interface 37 of the multilayer film 32 in a manner of quantum diffusion (see FIG. 3).

An example of a method for producing the heat generating element will be described. First, a base formed in a plate shape is prepared. Next, a multilayer film is formed on the base using a sputtering method. Accordingly, a plate-shaped heat generating element can be produced. When forming the base, it is preferable that the base is formed thicker than each of the first layer, the second layer, the third layer, and the fourth layer, and Ni is used as a material of the base, for example. The layers are preferably formed continuously in a vacuum state. This is because no natural oxide film is formed between adjacent layers and only the heterogeneous material interface can be formed between adjacent layers. The method for producing the heat generating element is not limited to the sputtering method, and a vapor deposition method, a wet method, a thermal spraying method, an electroplating method, or the like can be used. The shape of the heat generating element is a plate shape in the present embodiment, but the shape is not limited thereto, and may be a tubular shape or a columnar shape.

Another example of the method for producing a heat generating element will be described. First, a base formed in a bottomed tubular shape is prepared. Next, a multilayer film is formed on an outer surface of the base by using a wet film forming method. Accordingly, a heat generating element having a bottomed tubular shape can be produced. Examples of the wet film forming method include a spin coating method, a spray coating method, and a dipping method. The multilayer film may be formed by using an atomic layer deposition (ALD) method, or may be formed on the base while rotating the base by using a sputtering device provided with a rotation mechanism that rotates the base. The multilayer film is not limited to being provided on the outer surface of the base, and the multilayer film may be provided on an inner surface of the base or on both surfaces of the base.

[Heat Generating Method]

Figure 5:
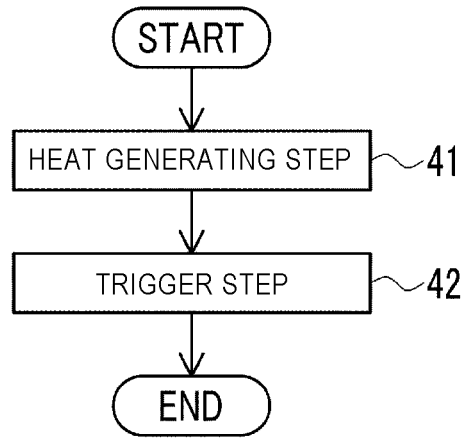
FIG. 5 is a flowchart showing the heat generating method according to the invention.

As shown in FIG. 5, the heat generating method includes a heat generating step 41 and a trigger step 42. Hereinafter, a heat generating method using the heat generating element 10 will be described. Descriptions of a heat generating method using the heat generating element 20 and a heat generating method using the heat generating element 30 will be omitted because those heat generating methods are the same as the heat generating method using the heat generating element 10 except that configurations of the heat generating elements are different.

In the heat generating step 41, the heat generating element 10 is heated by a heater to cause a first heat generating reaction in which the heat generating element 10 generates heat with a first heat generation amount. Examples of the heater includes various heat generating devices such as a ceramic heater and an electric furnace. The heater is electrically connected to a power supply, and generates heat when input power is applied from the power supply. A temperature of the heater is detected using a temperature sensor. The power supply and the temperature sensor are electrically connected to a power control unit. The power control unit controls the input power from the power supply based on a detection result of the temperature sensor.

Methods for causing the heat generating element 10 to generate heat in the heat generating step 41 include a method using a batch method and a method using a transmission method. First, the batch method will be described, and then the transmission method will be described.

An outline of a heat generating device for causing the heat generating element 10 to generate heat by the batch method will be described. The heat generating device using the batch method includes: the above-mentioned heat generating element 10; a hollow container that accommodates the heat generating element 10; a heater that heats the heat generating element 10; a gas introduction unit that introduces a hydrogen-based gas to an inside of the container; a gas discharge unit that discharges the hydrogen-based gas in the inside of the container to an outside of the container; and a temperature sensor that detects a temperature of the heat generating element 10. The container is made of a material having heat resistance and pressure resistance. The material of the container is not particularly limited, and examples thereof include carbon steel, austenitic stainless steel, heat-resistant nonferrous alloy steel, and quartz glass. The material of the container may be a material that reflects radiant heat generated by the heat generating element, for example, Ni, Cu, or Mo. The shape of the container is not particularly limited, and may be a cylindrical shape, an elliptic cylindrical shape, a square tubular shape, or the like. The container includes a pressure sensor that detects a pressure inside the container, a gas introduction port connected to the gas introduction unit, a gas discharge port connected to the gas discharge unit, and the like. The gas introduction unit introduces the hydrogen-based gas to the inside of the container through the gas introduction port. The gas discharge unit vacuum-evacuates the inside of the container through the gas discharge port. The gas discharge unit can control the pressure inside the container by adjusting a discharge amount of the hydrogen-based gas based on a detection result of the pressure sensor.

The heat generating step 41 using the batch method will be described. In the heat generating step 41 using the batch method, first, the hydrogen-based gas is supplied to the inside of the container by the gas introduction unit. Accordingly, hydrogen contained in the hydrogen-based gas is occluded in the heat generating element 10. Next, the introduction of the hydrogen-based gas to the inside of the container is stopped, the inside of the container is vacuum-evacuated by the gas discharge unit, and the heat generating element 10 is heated by the heater. Accordingly, hydrogen occluded in the heat generating element 10 is discharged from the heat generating element 10. The heat generating element 10 generates heat by allowing hydrogen to permeate through the heterogeneous material interface 17 in a manner of quantum diffusion in a process of occluding hydrogen, and generates heat by allowing hydrogen to permeate through the heterogeneous material interface 17 in a manner of quantum diffusion in a process of discharging hydrogen. As described above, in the heat generating step 41 using the batch method, the heat generating element 10 generates excess heat by occluding and discharging hydrogen. The occlusion and discharge of hydrogen may be repeatedly performed.

An outline of a heat generating device for causing the heat generating element 10 to generate heat by the transmission method will be described. The heat generating device using the transmission method includes: the above-mentioned heat generating element 10; a container having a first chamber and a second chamber partitioned by the heat generating element 10; a heater that heats the heat generating element 10; a gas introduction unit that supplies a hydrogen-based gas to the inside of the first chamber; a gas discharge unit that discharges the hydrogen-based gas in the inside of the second chamber to an outside of the second chamber; and a temperature sensor that detects the temperature of the heat generating element 10. The container is made of a material having heat resistance and pressure resistance. Examples of the material of the container include carbon steel, austenitic stainless steel, and heat-resistant nonferrous alloy steel. The material of the container may be a material that reflects radiant heat generated by the heat generating element, for example, Ni, Cu, or Mo. The shape of the container is not particularly limited, and may be a cylindrical shape, an elliptic cylindrical shape, a square tubular shape, or the like. The container includes a first pressure sensor that detects a pressure inside the first chamber, a second pressure sensor that detects a pressure inside the second chamber, and the like. The first chamber has a gas introduction port connected to the gas introduction unit, and the second chamber has a gas discharge port connected to the gas discharge unit. The gas introduction unit introduces the hydrogen-based gas to the inside of the first chamber through the gas introduction port. The gas introduction unit can control the pressure inside the first chamber by adjusting an introduction amount of the hydrogen-based gas based on a detection result of the first pressure sensor. The gas discharge unit vacuum-evacuates the inside of the second chamber through the gas discharge port. The gas discharge unit can control the pressure inside the second chamber by adjusting a discharge amount of the hydrogen-based gas based on a detection result of the second pressure sensor.

The heat generating step 41 using the transmission method will be described. In the heat generating step 41 using the transmission method, the hydrogen-based gas is introduced to the inside of the first chamber, and the inside of the second chamber is vacuum-evacuated. Accordingly, a hydrogen partial pressure in the first chamber increases, a hydrogen partial pressure in the second chamber decreases, and a difference in hydrogen partial pressure occurs on both sides of the heat generating element 10. When the difference in hydrogen partial pressure occurs on both sides of the heat generating element 10, a hydrogen molecule contained in the hydrogen-based gas is adsorbed on one surface (referred to as a front surface) of the heat generating element 10 disposed on a high-pressure side, and the hydrogen molecule is dissociated into two hydrogen atoms. The hydrogen atoms after dissociation penetrate into the heat generating element 10. That is, hydrogen is occluded in the heat generating element 10. The hydrogen atoms diffuse and pass through the inside of the heat generating element 10. On the other surface (referred to as a back surface) of the heat generating element 10 disposed on a low-pressure side, the hydrogen atoms that passed through the heat generating element 10 are recombined and discharged as a hydrogen molecule. That is, hydrogen is discharged from the heat generating element 10. In this way, the heat generating element 10 allows hydrogen to permeate from the high pressure side to the low pressure side. The expression "permeate" as used herein means that hydrogen is occluded on the front surface of the heat generating element and hydrogen is discharged from the back surface of the heat generating element. The heat generating element 10 generates heat by occluding hydrogen, and also generates heat by discharging hydrogen. By generating a difference in hydrogen partial pressure on both sides of the heat generating element 10, excess heat can be efficiently generated since the occlusion of hydrogen on the front surface of the heat generating element 10 and the discharge of hydrogen on the back surface of the heat generating element 10 are simultaneously performed, and hydrogen continuously permeates through the heat generating element 10. In the following description, the hydrogen partial pressure may be referred to as "pressure of hydrogen".

In the trigger step 42, a perturbation is imparted to input power to be applied to the heater in a state where the first heat generating reaction is occurring to trigger the second heat generating reaction in which the heat generating element 10 generates heat with a second heat generation amount larger than the first heat generation amount. By imparting the perturbation to the input power, a surface temperature of the heat generating element 10 can be perturbed. It is considered that, by imparting the perturbation to the heat generating element 10 in a state where the first heat generating reaction in which heat is generated with the first heat generation amount is occurring, diffusion of hydrogen occluded in the heat generating element 10 is changed, a concentration of hydrogen on the front surface of the heat generating element 10 or on the heterogeneous material interface 17 is changed, and the second heat generating reaction in which heat is generated with the second heat generation amount larger than the first heat generation amount is triggered. In this way, in the trigger step 42, the heat generation amount can be increased by imparting the perturbation to the surface temperature of the heat generating element 10. In the invention, the term "perturbation" to the input power means that, when a value of the input power immediately before the perturbation is imparted is set as a reference value, within a time of a specific range, after a variation of the input power within a specific range is added with respect to the reference value, the input power returns to the reference value. The expression "variation of the input power within a specific range" is a variation of the input power in which $\delta Pin/Pin$ is within a range of, for example, 0.01% or more and 100% or less when Pin represents the value of the input power immediately before the perturbation is imparted (the reference value) and $\delta Pin$ represents a magnitude of the variation of the input power (also referred to as a magnitude of perturbation). The expression "time of a specific range" is, for example, a time within a range of 0.1 minutes or longer and 100 minutes or shorter. The expression "immediately before the perturbation is imparted" means, for example, about several seconds to several minutes before the perturbation is imparted. The expression "returns to the reference value" means that the input power before and after the perturbation is substantially the same, and is not limited to a case where a difference between values of the input power before and after the perturbation is strictly set to 0 (zero).

Figure 6:
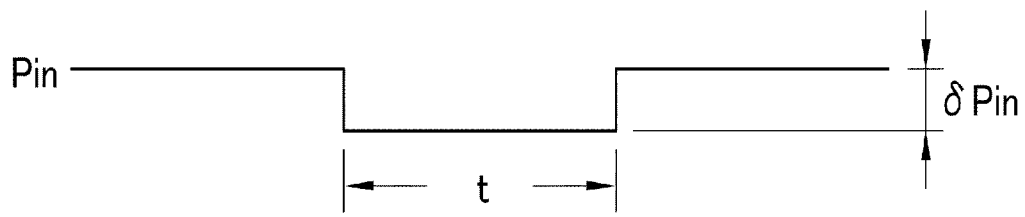
FIG. 6 is a diagram illustrating a way of imparting a perturbation.

FIG. 6 is a diagram illustrating a way of imparting the perturbation. $\delta Pin/Pin$ is preferably in a range of 0.01% or more and 100% or less, and more preferably in a range of 0.1% or more and 30% or less. A time t during which the perturbation is imparted is preferably in a range of 0.1 minutes or longer and 100 minutes or shorter, and more preferably in a range of 1 minute or longer and 10 minutes or shorter. The t is appropriately set according to a magnitude of $\delta Pin$ or a magnitude of $\delta Pin/Pin$, and may be set to a short time when $\delta Pin$ is large, for example. The perturbation can be imparted by decreasing and then increasing the input power as shown in FIG. 6, but is not limited thereto. Although not shown, the perturbation can also be imparted by increasing and then decreasing the input power. It is desired that the surface temperature of the heat generating element 10 varies by several degrees Celsius to several tens of degrees Celsius due to the perturbation of the input power.

It is preferable that the trigger step 42 is performed after a lapse of a predetermined time after the excess heat is generated in the heat generating step 41. For example, the trigger step 42 is performed after a lapse of 3 hours or longer after the excess heat is generated in the heat generating step 41.

In the trigger step 42, the perturbation may be repeatedly performed after a lapse of a predetermined time. For example, the perturbation is repeatedly performed after a lapse of 3 hours or longer, and preferably after a lapse of 5 hours or longer.

In the above-mentioned heat generating method, in the trigger step 42, by imparting the perturbation to the input power to be applied to the heater in a state where the first heat generating reaction is occurring to trigger the second heat generating reaction in which the heat generating element 10 generates heat with the second heat generation amount larger than the first heat generation amount. As a result, the heat generating reaction can be further enhanced by only imparting the perturbation to the input power as described above without applying a large amount of energy during the heat generating reaction.

[Experiments]

Experiments using a heat generating method in which a heat generating element is caused to generate heat by a batch method and results thereof will be described below. As an experiment using the batch method, the following experiments were performed: Experiment 1 in which the input power was decreased and then increased in the trigger step 42 using the heat generating element 10; Experiment 2 performed in the same manner as Experiment 1 except that the input power was increased and then decreased in the trigger step 42; and Experiment 3 performed in the same manner as Experiment 1 except that the heat generating element 20 was used instead of the heat generating element 10.

Figure 7:
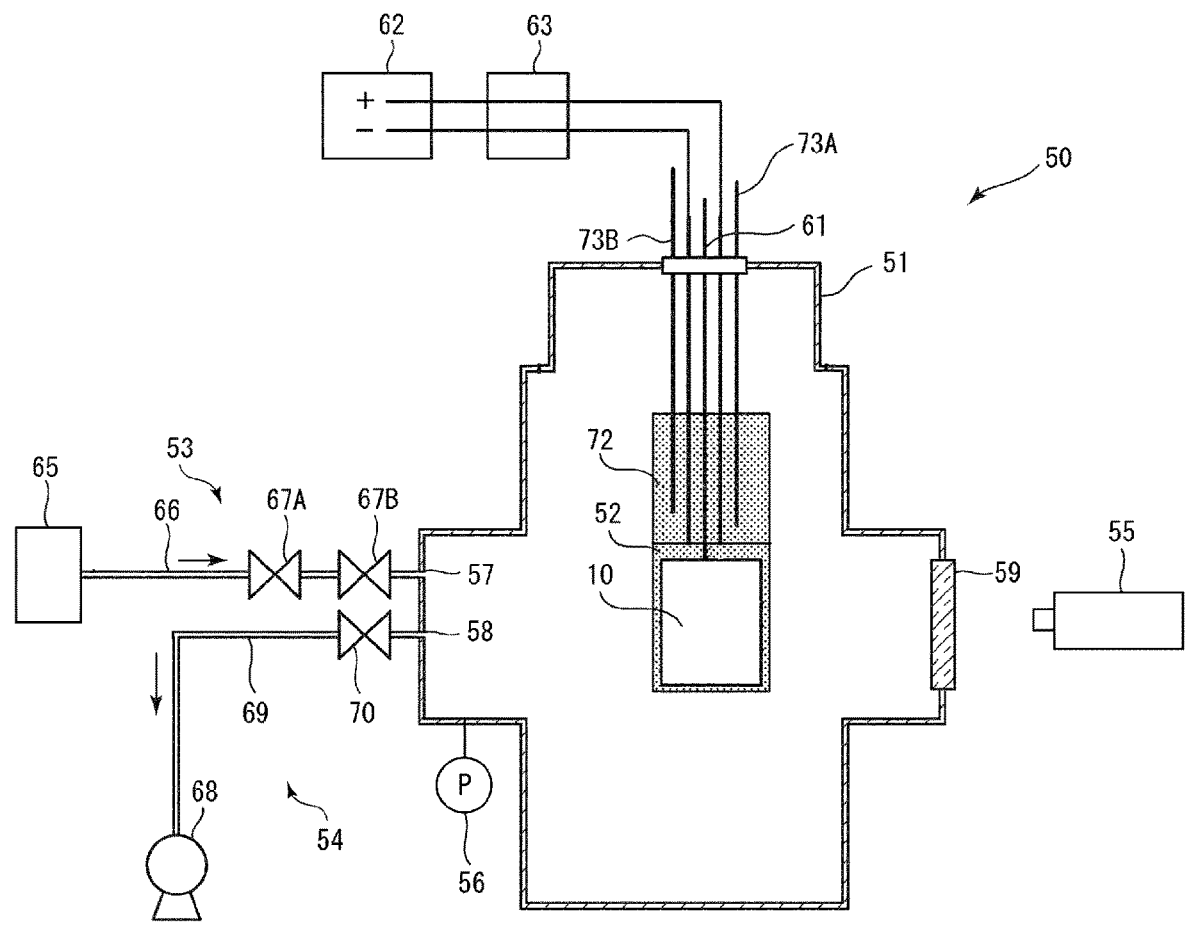
FIG. 7 is a schematic view showing a configuration of a heat generating device using a batch method.

The heat generating device using the batch method used in the experiments will be described. FIG. 7 is a schematic view showing a configuration of the heat generating device using the batch method. FIG. 7 shows a heat generating device 50 in Experiment 1 using the heat generating element 10. Descriptions of the heat generating device in Experiment 2 and the heat generating device in Experiment 3 will be omitted.

The heat generating device 50 using the batch method includes heat generating elements 10, a container 51, a heater 52, a gas introduction unit 53, a gas discharge unit 54, and temperature sensors 55. In the heat generating device 50, two heat generating elements 10 were used. In FIG. 7, only one heat generating element 10 of the two heat generating elements 10 is shown, and the other heat generating element 10 is not shown. Each of the heat generating elements 10 has a plate shape, and has a square shape in which one side has a length of 25 mm in a plan view.

The container 51 is a hollow sealed container that accommodates the heat generating elements 10. The container 51 includes a pressure sensor 56 that detects a pressure inside the container 51, a gas introduction port 57 connected to the gas introduction unit 53, a gas discharge port 58 connected to the gas discharge unit 54, and a viewport 59 formed of an infrared transmitting material such as cobalt glass.

The heater 52 is a plate-shaped ceramic heater, and includes a thermocouple 61 that detects a temperature of the heater 52. The thickness of the heater 52 is 2.2 mm. The heater 52 is connected to a power supply 62 and a current/voltage meter 63 provided outside the container 51. The current/voltage meter 63 detects the input power to be applied to the heater 52.

The gas introduction unit 53 includes: a gas storage portion 65 that stores a hydrogen-based gas; a gas introduction pipe 66 that connects the gas storage portion 65 and the gas introduction port 57 of the container 51; and adjustment valves 67A and 67B that are provided in the gas introduction pipe 66 and adjust a flow rate and a pressure of the hydrogen-based gas.

The gas discharge unit 54 includes: a vacuum pump 68 such as a dry pump; a gas discharge pipe 69 that connects the vacuum pump 68 and the gas discharge port 58 of the container 51; and an adjustment valve 70 that adjusts the flow rate and the pressure of the hydrogen-based gas.

The temperature sensors 55 are infrared radiation thermometers provided outside the container 51, and detect surface temperatures of the heat generating elements 10 via the viewport 59 of the container 51. FIG. 7 shows the temperature sensor 55 that detects a temperature of one heat generating element 10 of the two heat generating elements 10. The temperature sensor 55 that detects a temperature of the other heat generating element 10 of the two heat generating elements 10 is not shown.

The two heat generating elements 10 and the heater 52 are integrated with each other using a holder 72. The holder 72 is formed of, for example, ceramics. The holder 72 includes a pair of holder halves (not shown), and holds the heat generating element 10 and the heater 52 between the holder halves. Each of the holder halves has an opening through which the heat generating element 10 is exposed. The holder 72 is provided with temperature sensors 73A and 73B that detect a temperature of the holder 72. The temperature sensor 73A detects a temperature at a position close to the heat generating element 10, and the temperature sensor 73B detects a temperature at a position away from the heat generating element 10.

Figure 8:
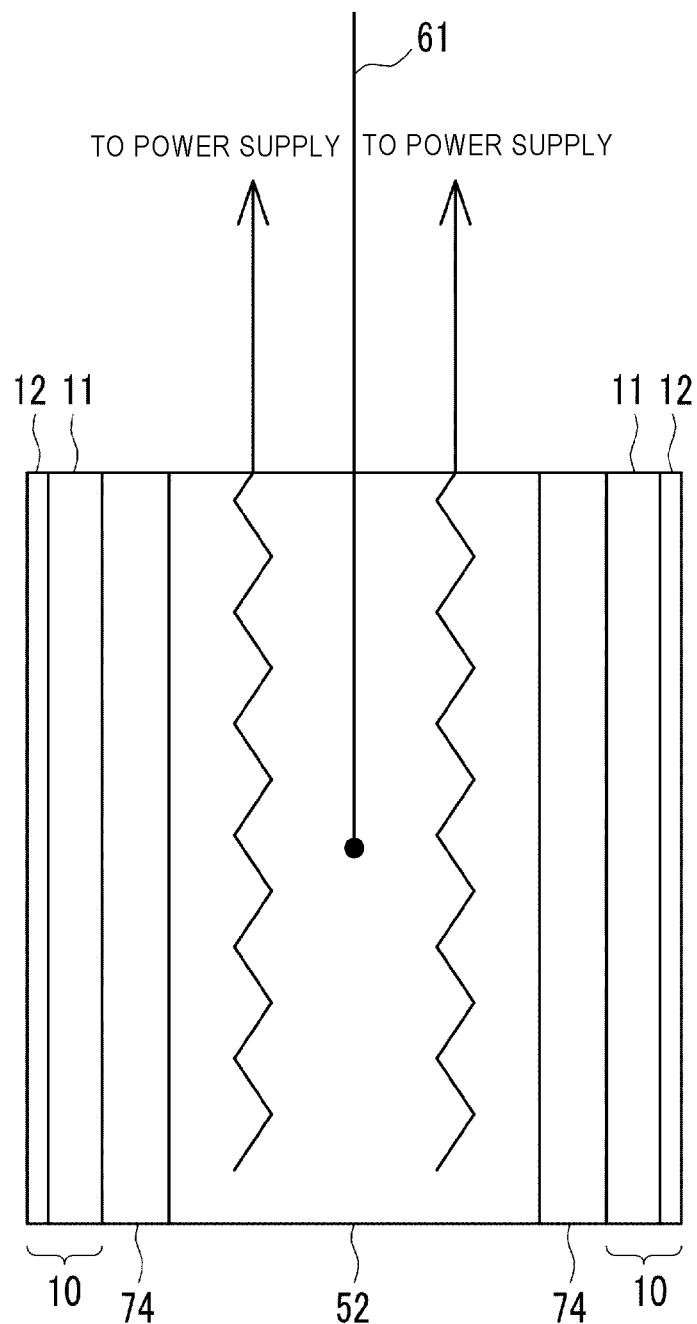
FIG. 8 is a diagram illustrating main parts of the heat generating device using the batch method.

As shown in FIG. 8, one heat generating element 10 was disposed on both surfaces of the heater 52. A shielding plate 74 is provided between the heater 52 and each of the heat generating elements 10. As the shielding plate 74, a $SiO_2$ plate made of $SiO_2$ and having a thickness of 0.3 mm was used. The heat generating element 10 was integrated with the heater 52 by using the holder 72 (see FIG. 7) in a state where the base 11 was directed toward the heater 52 and was in contact with the shielding plate 74. As the base 11 of the heat generating element 10, an Ni substrate made of Ni and having a thickness of 0.1 mm was used.

The heat generating element 10 used in Experiment 1 was obtained by forming the multilayer film 12 in which the first layer 14 made of Cu and the second layer 15 made of Ni were stacked on the surface of the base 11 made of Ni. The thickness of the first layer 14 was set to 14 nm. The thickness of the second layer 15 was set to 2 nm. The numbers of layers of the first layer 14 and the second layer 15 were each set to 6. The heat generating element 10 used in Experiment 2 is the same as the heat generating element 10 used in Experiment 1. The heat generating element 20 used in Experiment 3 was obtained by forming the multilayer film 22 in which the first layer 14 made of Cu, the second layer 15 made of Ni, and the third layer 24 made of CaO were stacked on the surface of the base 11 made of Ni. The thickness of the first layer 14 and the thickness of the third layer 24 were each set to 2 nm. The thickness of the second layer 15 was set to 7 nm. The numbers of layers of the first layer 14 and the third layer 24 were each set to 6. The number of layers of the second layer 15 disposed between the first layer 14 and the third layer 24 was 12.

An experimental method using the batch method will be described using Experiment 1 as an example. First, the heat generating element 10 was baked by the heater 52 to remove water and the like adhering to the surface of the heat generating element 10. Then, as the heat generating step 41, the introduction of the hydrogen-based gas to the inside of the container 51 and the vacuum evacuation of the inside of the container 51 were performed. The hydrogen-based gas was introduced at 80° C. to 500° C. and at 100 Pa or more. By increasing the temperature of the heater 52 and setting the surface temperature of the heat generating element 10 to 600° C. or higher, excess heat was generated from the heat generating element 10. Next, as the trigger step 42, the perturbation was imparted to the input power to be applied to the heater 52 after a lapse of 3 hours or longer since the excess heat was generated in the heat generating step 41.

Figure 9:
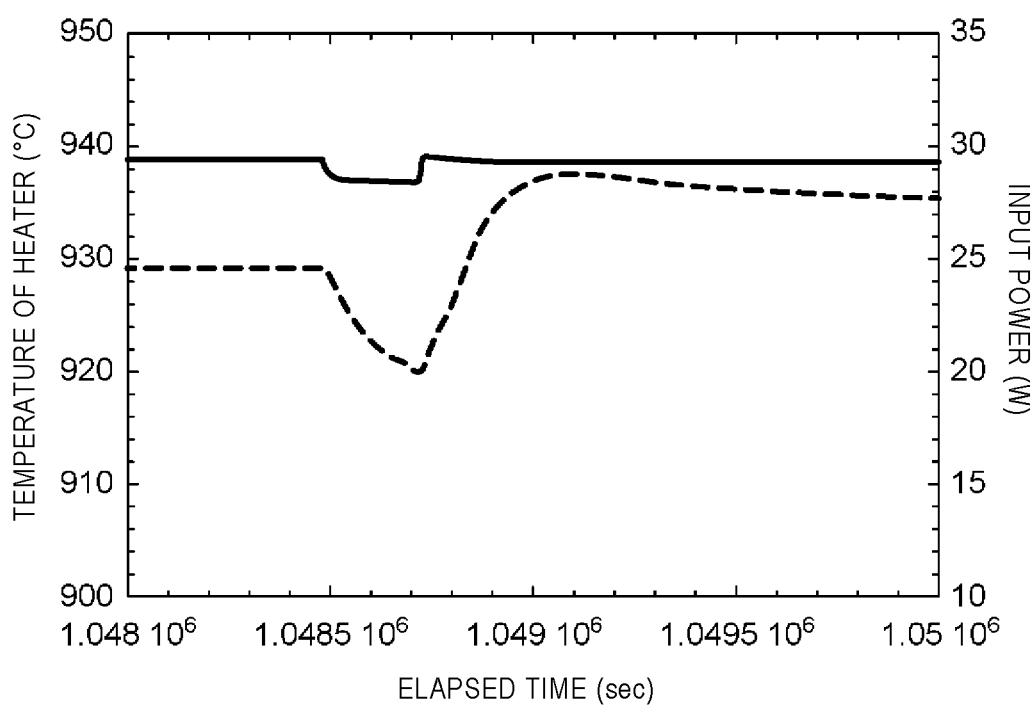
FIG. 9 is a graph showing a relationship between input power and a temperature of a heater in Experiment 1.

Results of the experiment using the batch method will be described. FIG. 9 is a graph showing a relationship between the input power and the temperature of the heater 52 in Experiment 1. In FIG. 9, a horizontal axis indicates the elapsed time (sec), a first vertical axis on a left side indicates the temperature (° C.) of the heater 52 detected by the thermocouple 61 of the heater 52, and a second vertical axis on a right side indicates the input power (W) applied to the heater 52. The solid line is a graph showing the input power, and the dotted line is a graph showing the temperature of the heater 52. In Experiment 1, the magnitude of the perturbation δPin was 0.9 W, and the time t during which the perturbation was imparted was 260 sec. An amount of perturbation energy was 230 J. The amount of perturbation energy was obtained by integrating the temperature of the heater 52 after perturbation with the time. It was confirmed from FIG. 9 that when comparing the temperatures of the thermocouple 61 before and after the perturbation was imparted, the temperature of the thermocouple 61 increased by 8.3° C. by imparting the perturbation.

Figure 10:
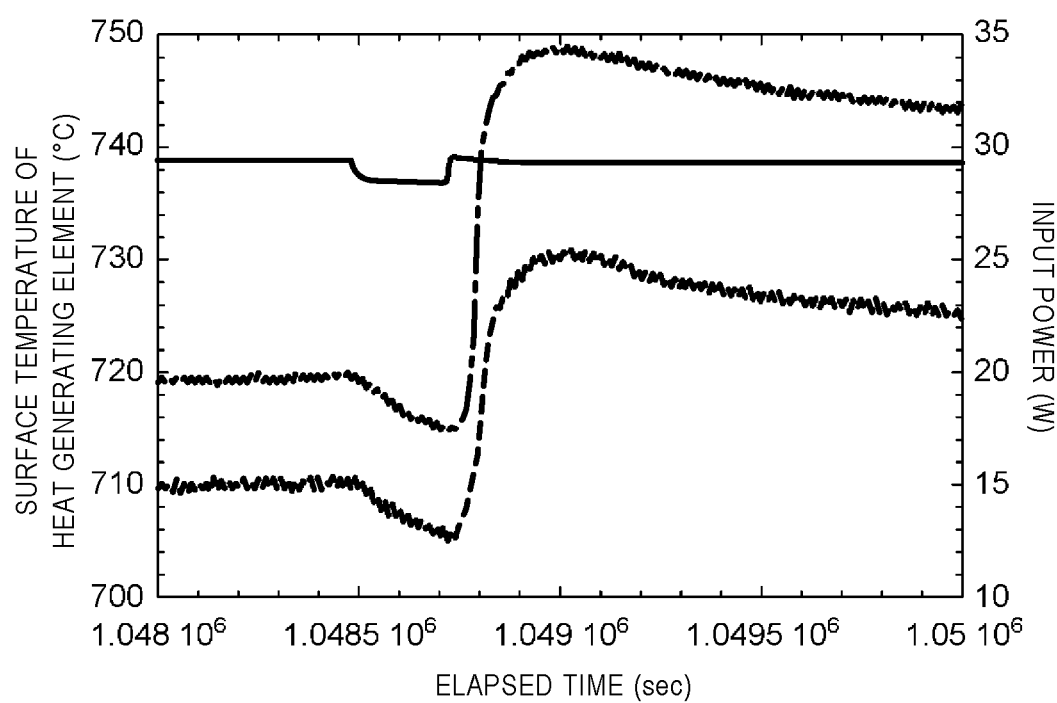
FIG. 10 is a graph showing a relationship between the input power and a surface temperature of a heat generating element in Experiment 1.

FIG. 10 is a graph showing a relationship between the input power and the surface temperature of the heat generating element 10 in Experiment 1. In FIG. 10, a horizontal axis indicates the elapsed time (sec), a first vertical axis on a left side indicates the surface temperature (° C.) of the heat generating element 10 detected by the temperature sensor 55, and a second vertical axis on a right side indicates the input power (W) applied to the heater 52. The solid line is a graph showing the input power, the dotted line is a graph showing the surface temperature of one heat generating element 10, and the dash-dotted line is a graph showing the surface temperature of the other heat generating element 10. It was confirmed from FIG. 10 that when comparing the surface temperatures of the two heat generating elements 10 before and after the perturbation was imparted, the surface temperature of one heat generating element 10 indicated by the dotted line increased by 20.3° C. and the surface temperature of the other heat generating element 10 indicated by the dash-dotted line increased by 29.6° C. by imparting the perturbation. An amount of energy of the excess heat was 13,000 J. The amount of energy of the excess heat was obtained by integrating the surface temperature of the heat generating element 10 after perturbation with the time.

Figure 11:
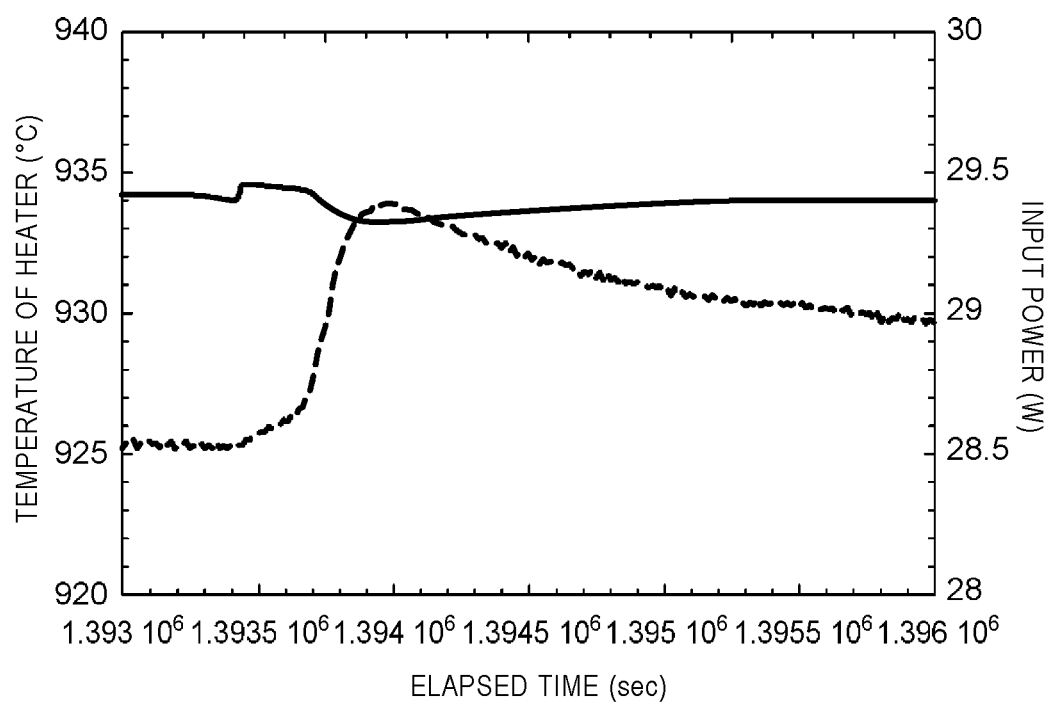
FIG. 11 is a graph showing a relationship between input power and a temperature of a heater in Experiment 2.

FIG. 11 is a graph showing a relationship between the input power and the temperature of the heater 52 in Experiment 2. In FIG. 11, a horizontal axis indicates the elapsed time (sec), a first vertical axis on a left side indicates the temperature (° C.) of the heater 52 detected by the thermocouple 61 of the heater 52, and a second vertical axis on a right side indicates the input power (W) applied to the heater 52. The solid line is a graph showing the input power, and the dotted line is a graph showing the temperature of the heater 52. In Experiment 2, the magnitude of the perturbation δPin was set to 0.07 W, and the time t during which the perturbation was imparted was set to 264 sec. An amount of perturbation energy was 19 J. It was confirmed from FIG. 11 that when comparing the temperatures of the thermocouple 61 before and after the perturbation is imparted, the temperature of the thermocouple 61 increased by 8.0° C. by imparting the perturbation.

Figure 12:
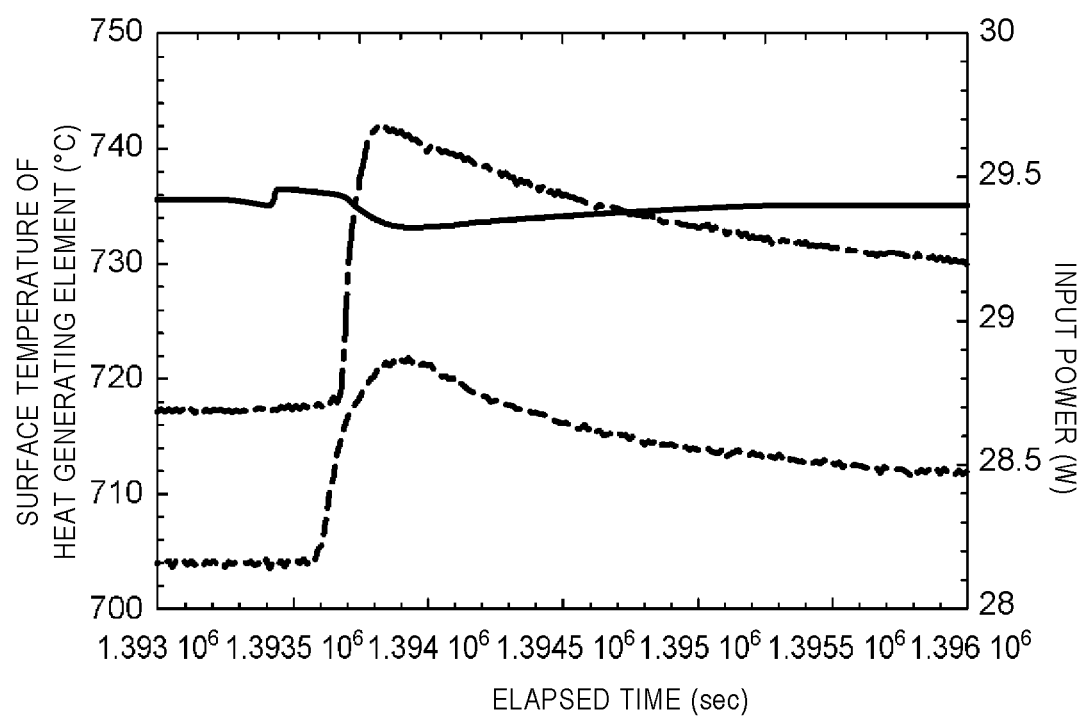
FIG. 12 is a graph showing a relationship between the input power and a surface temperature of a heat generating element in Experiment 2.

FIG. 12 is a graph showing a relationship between the input power and the surface temperature of the heat generating element 10 in Experiment 2. In FIG. 12, a horizontal axis indicates the elapsed time (sec), a first vertical axis on a left side indicates the surface temperature (° C.) of the heat generating element 10 detected by the temperature sensor 55, and a second vertical axis on a right side indicates the input power (W) applied to the heater 52. The solid line is a graph showing the input power, the dotted line is a graph showing the surface temperature of one heat generating element 10, and the dash-dotted line is a graph showing the surface temperature of the other heat generating element 10. It was confirmed from FIG. 12 that when comparing the surface temperatures of the two heat generating elements 10 before and after the perturbation was imparted, the surface temperature of one heat generating element 10 indicated by the dotted line increased by 18.0° C. and the surface temperature of the other heat generating element 10 indicated by the dash-dotted line increased by 24.6° C. by imparting the perturbation. An amount of energy of the excess heat was 2,600 J.

Figure 13:
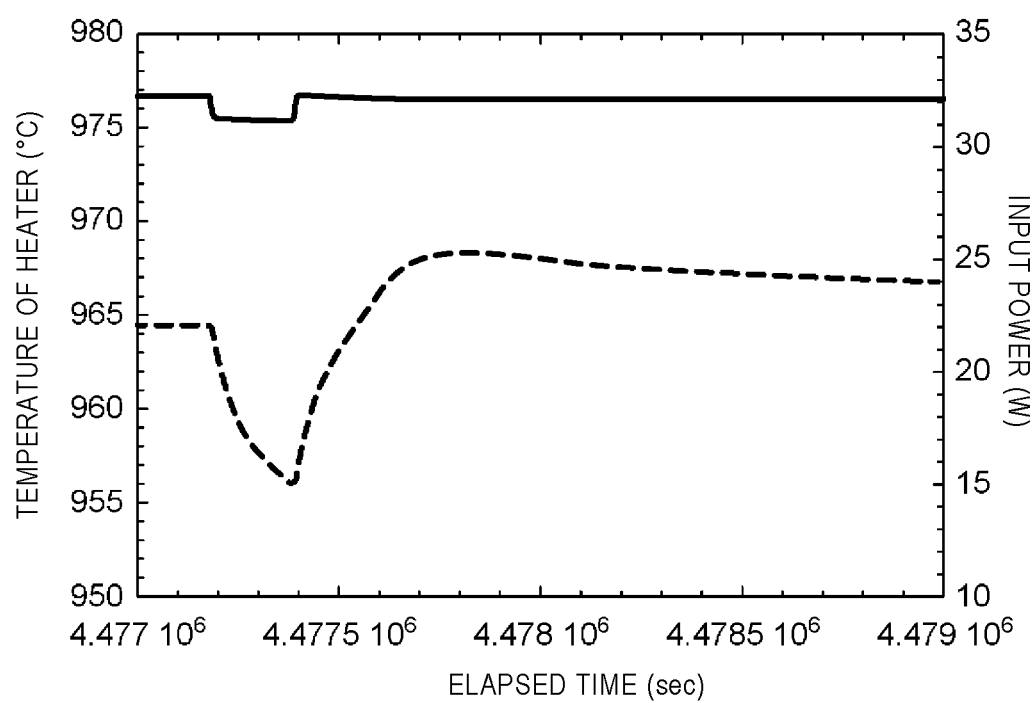
FIG. 13 is a graph showing a relationship between input power and a temperature of a heater in Experiment 3.

FIG. 13 is a graph showing a relationship between the input power and the temperature of the heater 52 in Experiment 3. In FIG. 13, a horizontal axis indicates the elapsed time (sec), a first vertical axis on a left side indicates the temperature (° C.) of the heater 52 detected by the thermocouple 61 of the heater 52, and a second vertical axis on a right side indicates the input power (W) applied to the heater 52. The solid line is a graph showing the input power, and the dotted line is a graph showing the temperature of the heater 52. In Experiment 3, the magnitude of the perturbation δPin was set to 1.0 W, and the time t during which the perturbation was imparted was set to 210 sec. An amount of perturbation energy was 210 J. It was confirmed from FIG. 13 that when comparing the temperatures of the thermocouple 61 before and after the perturbation was imparted, the temperature of the thermocouple 61 increased by 3.8° C. by imparting the perturbation.

Figure 14:
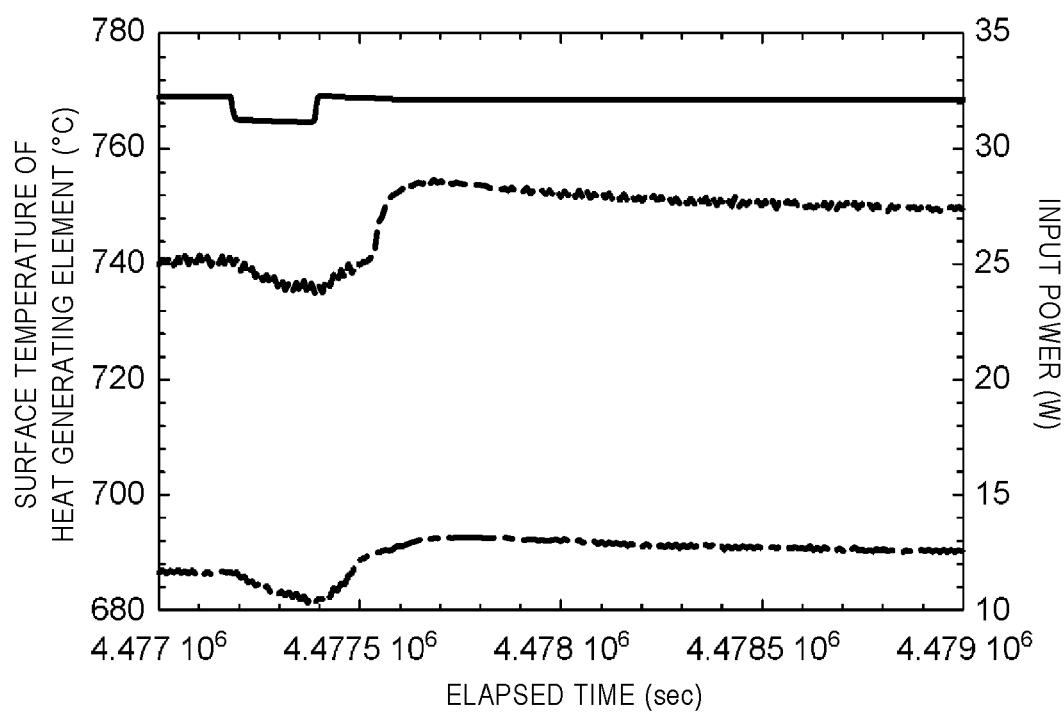
FIG. 14 is a graph showing a relationship between the input power and a surface temperature of a heat generating element in Experiment 3.

FIG. 14 is a graph showing a relationship between the input power and the surface temperature of the heat generating element 20 in Experiment 3. In FIG. 14, a horizontal axis indicates the elapsed time (sec), a first vertical axis on a left side indicates the surface temperature (° C.) of the heat generating element 20 detected by the temperature sensor 55, and a second vertical axis on a right side indicates the input power (W) applied to the heater 52. The solid line is a graph showing the input power, the dotted line is a graph showing the surface temperature of one heat generating element 20, and the dash-dotted line is a graph showing the surface temperature of the other heat generating element 20. It was confirmed from FIG. 14 that when comparing the surface temperatures of the two heat generating elements 20 before and after the perturbation was imparted, the surface temperature of one heat generating element 20 indicated by the dotted line increased by 13.7° C. and the surface temperature of the other heat generating element 20 indicated by the dash-dotted line increased by 6.2° C. by imparting the perturbation. An amount of energy of the excess heat was 1,560 J.

According to Experiments 1 to 3 described above, in the batch method, by imparting the perturbation to the input power to be applied to the heater 52, it is possible to trigger the heat generating reaction of the heat generating element and increase the heat generation amount without applying a large amount of energy to the heat generating element.

An experiment using a heat generating method in which a heat generating element is caused to generate heat by a transmission method and results thereof will be described below. As the experiment using the transmission method, Experiment 4 was performed in which input power was decreased and then increased in the trigger step 42 by using the heat generating element 20.

Figure 15:
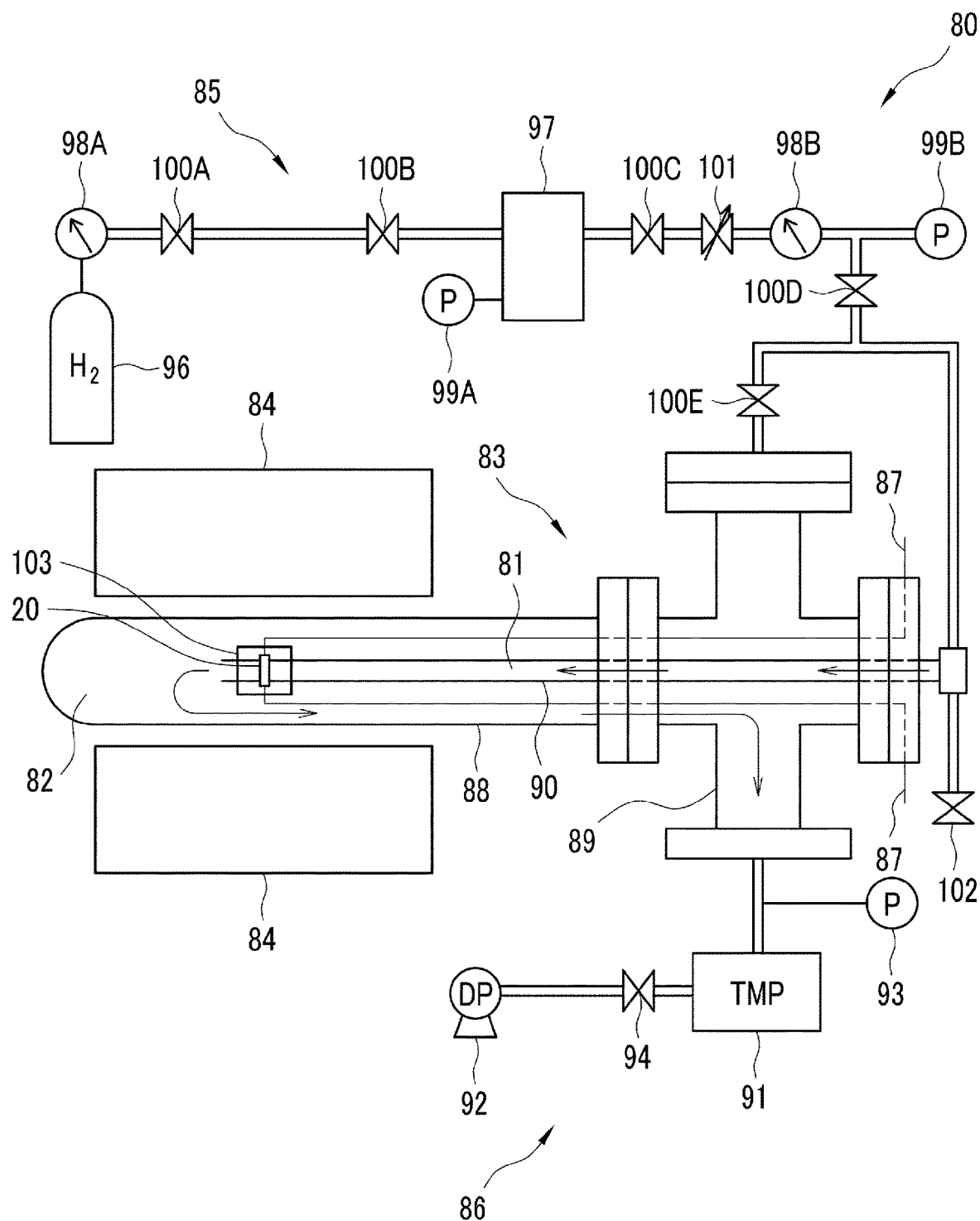
FIG. 15 is a schematic view showing a configuration of a heat generating device using a transmission method.

The heat generating device using the transmission method used in the experiments will be described. FIG. 15 is a schematic view showing a configuration of the heat generating device using the transmission method.

A heat generating device 80 using the transmission method includes: the heat generating element 20; a container 83 having a first chamber 81 and a second chamber 82 partitioned by the heat generating element 20; a heater 84 that heats the heat generating element 20; a gas introduction unit 85 that supplies a hydrogen-based gas to an inside of the first chamber 81; a gas discharge unit 86 that discharges the hydrogen-based gas in the inside of the second chamber 82 to an outside of the second chamber 82; and a temperature sensor 87 that detects the temperature of the heat generating element 20.

The container 83 includes a quartz glass pipe 88, a vacuum pipe 89 for vacuum-evacuating an inside of the quartz glass pipe 88, amounting pipe 90 for installing the heat generating element 20 in the inside of the quartz glass pipe 88, and the like. The quartz glass pipe 88 has a sealed tip end and an open base end.

The vacuum pipe 89 is connected to the base end of the quartz glass pipe 88. The gas discharge unit 86 is connected to the vacuum pipe 89. The gas discharge unit 86 includes a turbo molecular pump (TMP) 91, a dry pump (DP) 92, a pressure sensor 93, a gate valve 94, and the like. The gas discharge unit 86 is not connected to the mounting pipe 90. Therefore, an inside of the mounting pipe 90 is not vacuum-evacuated.

The mounting pipe 90 is inserted into the inside of the quartz glass pipe 88 through the vacuum pipe 89, and one end of the mounting pipe 90 is disposed outside the vacuum pipe 89 (outside the quartz glass pipe 88) and the other end of the mounting pipe 90 is disposed in the inside of the quartz glass pipe 88. The mounting pipe 90 is made of SUS. The gas introduction unit 85 that introduces the hydrogen-based gas to the inside of the mounting pipe 90 is connected to one end of the mounting pipe 90. The gas introduction unit 85 includes a hydrogen cylinder 96 that stores the hydrogen-based gas, a buffer tank 97, flow rate sensors 98A and 98B, pressure sensors 99A and 99B, gate valves 100A, 100B, 100C, 100D, and 100E, an adjustment valve 101, a leak valve 102, and the like. A VCR joint 103 is provided at the other end of the mounting pipe 90 such that the heat generating element 20 can be attached to and detached from the VCR joint 103. The VCR joint 103 has two leak holes penetrating an inner peripheral surface and an outer peripheral surface of the VCR joint 103 at a position where the heat generating element 20 is disposed. The heat generating element 20 is disposed inside the VCR joint 103 in a state of being sandwiched between two SUS gaskets.

In the container 83, an internal space of the mounting pipe 90 and an internal space of the quartz glass pipe 88 are partitioned by the heat generating element 20. The internal space of the mounting pipe 90 is pressurized by the introduction of the hydrogen-based gas. The internal space of the quartz glass pipe 88 is depressurized by the vacuum evacuation of the gas. Accordingly, a pressure of hydrogen in the internal space of the mounting pipe 90 is higher than a pressure of hydrogen in the internal space of the quartz glass pipe 88. Therefore, the internal space of the mounting pipe 90 is the first chamber 81, and the internal space of the quartz glass pipe 88 is the second chamber 82. When a pressure difference is generated on both sides of the heat generating element 20, hydrogen permeates from the internal space (the first chamber 81) of the mounting pipe 90 on the high-pressure side to the internal space (the second chamber 82) of the quartz glass pipe 88 on the low-pressure side. As described above, the heat generating element 20 generates heat by occluding hydrogen from one surface disposed on the high-pressure side and generates excess heat by discharging hydrogen from the other surface disposed on the low-pressure side in the process of allowing hydrogen to permeate therethrough.

A thermocouple (a K-type sheath thermocouple) was used as the temperature sensor 87. In the experiment, two thermocouples were prepared and inserted into the two leak holes of the VCR joint 103. The two thermocouples were in contact with the heat generating element 20, and the temperature of the heat generating element 20 was measured. An electric furnace was used as the heater 84. The heater 84 as the electric furnace was disposed so as to cover an outer periphery of the quartz glass pipe 88.

In Experiment 4, the heat generating element 20 having a diameter of 20 mm in a plan view was used. As the base 11 of the heat generating element 20, an Ni substrate made of Ni and having a thickness of 0.1 mm was used. The heat generating element 20 was obtained by forming the multilayer film 22 in which the first layer 14 made of Cu, the second layer 15 made of Ni, and the third layer 24 made of CaO were stacked on both surfaces of the base 11 made of Ni. The thickness of the first layer 14 and the thickness of the third layer 24 were each set to 2 nm. The thickness of the second layer 15 was set to 7 nm. The numbers of layers of the first layer 14 and the third layer 24 were each set to 6. The number of layers of the second layer 15 disposed between the first layer 14 and the third layer 24 was 12.

An experimental method using the transmission method will be described. First, the heat generating element 20 was baked by the heater 84 to remove water and the like adhering to the surface of the heat generating element 20. Then, as the heat generating step 41, the hydrogen-based gas was supplied to the first chamber 81 (the internal space of the mounting pipe 90), and a pressure in the first chamber 81 was adjusted to 102,000 Pa. The second chamber 82 (the internal space of the quartz glass pipe 88) was vacuum-evacuated, and a pressure in the second chamber 82 was adjusted to 0.003 Pa. By increasing the temperature of the heater 84 and setting the surface temperature of the heat generating element 20 to 600° C. or higher, excess heat was generated from the heat generating element 20. Next, as the trigger step 42, perturbation was imparted to the input power to be applied to the heater 84 after a lapse of 3 hours or longer since the excess heat was generated in the heat generating step 41.

Figure 16:
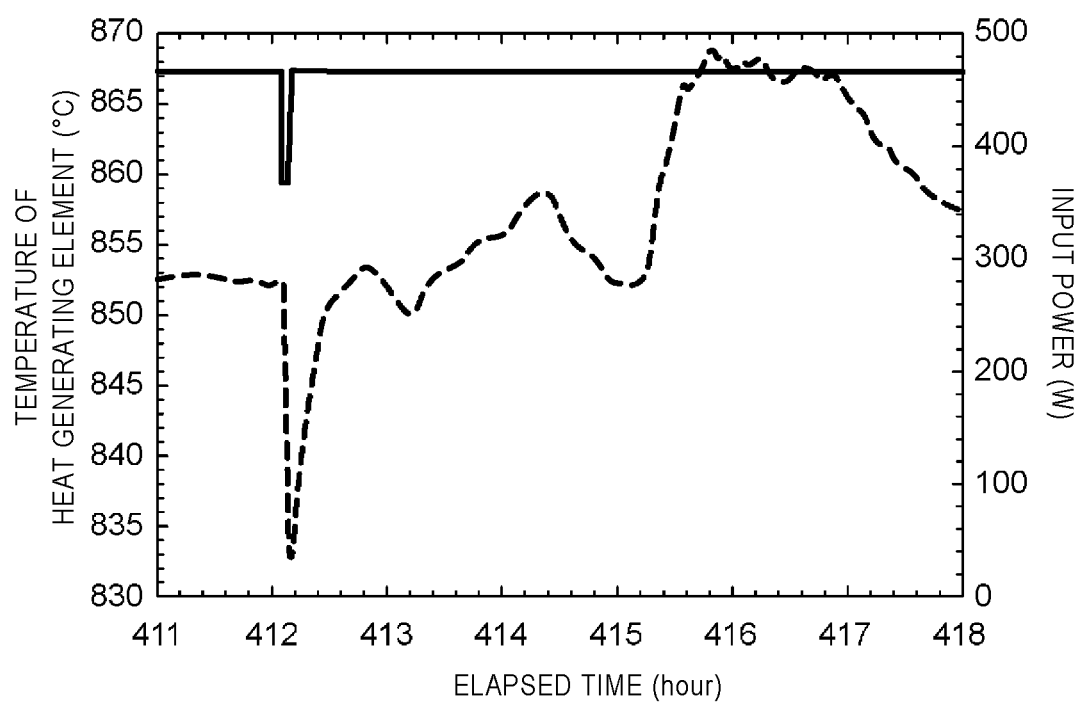
FIG. 16 is a graph showing a relationship between input power and a temperature of a heat generating element in Experiment 4.

Results of the experiment using the transmission method will be described. FIG. 16 is a graph showing a relationship between the input power and the temperature of the heat generating element 20 in Experiment 4. In FIG. 16, a horizontal axis indicates the elapsed time (hour), a first vertical axis on a left side indicates the temperature (° C.) of the heat generating element 20 detected by the temperature sensor 87, and a second vertical axis on a right side indicates the input power (W) applied to the heater 84. The solid line is a graph showing the input power, and the dotted line is a graph showing the temperature of the heat generating element 20. The temperature of the heat generating element 20 shown in FIG. 16 is an average value of temperatures measured by two thermocouples as the temperature sensor 87. In Experiment 4, the magnitude of the perturbation $\delta P_{in}$ was set to 99 W, and the time t during which the perturbation was imparted was set to 232 sec. An amount of perturbation energy was 23 kJ. It was confirmed from FIG. 16 that when comparing the temperatures of the heat generating element 20 before and after the perturbation was imparted, the temperature of the heat generating element 20 increased by 16° C. by imparting the perturbation. An amount of energy of the excess heat was 160 kJ.

According to Experiment 4 described above, in the transmission method, by imparting the perturbation to the input power to be applied to the heater 84, it is possible to trigger the heat generating reaction of the heat generating element and increase the heat generation amount without applying a large amount of energy to the heat generating element.

The heat generating device using the transmission method may further include an inert gas introduction unit that introduces an inert gas to the inside of the second chamber. As the inert gas, for example, argon gas or nitrogen gas is used. By introducing the inert gas to the inside of the second chamber, it is possible to generate a difference in hydrogen partial pressure between the first chamber and the second chamber. Due to the difference in hydrogen partial pressure generated between the first chamber and the second chamber, the hydrogen-based gas in the first chamber permeates through the heat generating element and moves to the second chamber. The heat generating element generates excess heat by the permeation of the hydrogen-based gas. The hydrogen-based gas in the second chamber is discharged together with the inert gas by the gas discharge unit.

As the experiment using the batch method, Experiment 5 was performed in which the perturbation was repeated after a lapse of a predetermined time in the trigger step 42. Experiment 5 was performed using the heat generating device 50 using the batch method (see FIG. 7). In Experiment 5, the heat generating element 10 having the same configuration as those in Experiment 1 and Experiment 2 was used. That is, in the heat generating element 10 used in Experiment 5, the multilayer film 12 in which the first layer 14 made of Cu and the second layer 15 made of Ni were stacked was formed on the surface of the base 11 made of Ni, the thickness of the first layer 14 was set to 14 nm, the thickness of the second layer 15 was set to 2 nm, and the numbers of layers of the first layer 14 and the second layer 15 were each set to 6.

First, the heat generating element 10 was baked by the heater 52 to remove water and the like adhering to the surface of the heat generating element 10. Then, as the heat generating step 41, the introduction of the hydrogen-based gas to the inside of the container 51 and the vacuum evacuation of the inside of the container 51 were performed. The hydrogen-based gas was introduced at 80° C. to 500° C. and at 100 Pa or more. By increasing the temperature of the heater 52 and setting the surface temperature of the heat generating element 10 to 600° C. or higher, excess heat was generated from the heat generating element 10. Next, as the trigger step 42, the perturbation was imparted to the input power to be applied to the heater 52 after a lapse of 3 hours or longer since the excess heat was generated in the heat generating step 41. In Experiment 5, in the trigger step 42, the way of imparting the perturbation in Experiment 1 was combined with the way of imparting the perturbation in Experiment 2.

Figure 17:
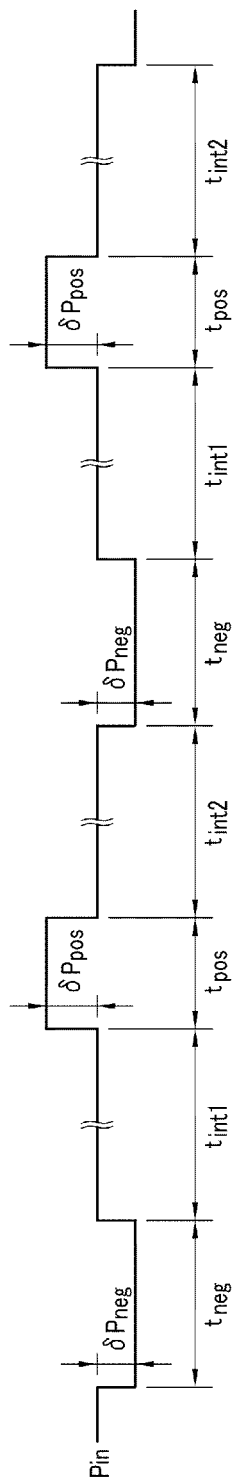
FIG. 17 is a diagram illustrating a way of imparting a perturbation in Experiment 5.

As shown in FIG. 17, in the trigger step 42, a first perturbation (also referred to as a negative perturbation) in which the input power was decreased and then increased and a second perturbation (also referred to as a positive perturbation) in which the input power was increased and then decreased were alternately repeated. Specifically, first, the negative perturbation was performed, then the positive perturbation was performed after the elapse of three hours since the negative perturbation was performed, then the negative perturbation was performed again after the elapse of three hours since the positive perturbation was performed, and the positive perturbation and the negative perturbation were alternately repeated again after the negative perturbation was performed. $\delta P_{neg}$ represents a magnitude of the negative perturbation with respect to the reference value Pin of the input power. $\delta P_{pos}$ represents a magnitude of the positive perturbation with respect to the reference value Pin of the input power. $t_{neg}$ represents a time during which the negative perturbation is imparted. $t_{pos}$ represents a time during which the positive perturbation is imparted. $t_{int1}$ represents a time from when the input power is decreased and then increased by the negative perturbation to when the positive perturbation is performed. $t_{int2}$ represents a time from when the input power is increased and then decreased by the positive perturbation to when the negative perturbation is performed. In Experiment 5, $\delta P_{neg}$, $\delta P_{pos}$, $t_{neg}$, and $t_{pos}$ satisfy the following Equation 1.

$$t_{neg} \times \delta P_{neg} = t_{pos} \times \delta P_{pos} \quad \text{(Equation 1)}$$

Since $\delta P_{neg}$, $\delta P_{pos}$, $t_{neg}$, and $t_{pos}$ are set to satisfy the above-mentioned Equation 1, in a specific period including the same number of negative perturbations and positive perturbations, a decrease in input power with respect to the reference value Pin when the negative perturbation is performed and an increase in input power with respect to the reference value Pin when the positive perturbation is performed cancel each other out. When a time average of the input power by the perturbations in the specific period is calculated, the time average is the same value as the reference value Pin. In Experiment 5, $\delta P_{neg}$ was set to 0.98 W, $\delta P_{pos}$ was set to 1.47 W, $t_{neg}$ was set to 180 sec, and $t_{pos}$ was set to 120 sec. In addition, Pin was set to 27.9 W, and both $t_{int1}$ and $t_{int2}$ were set to 3 hours.

Figure 18:
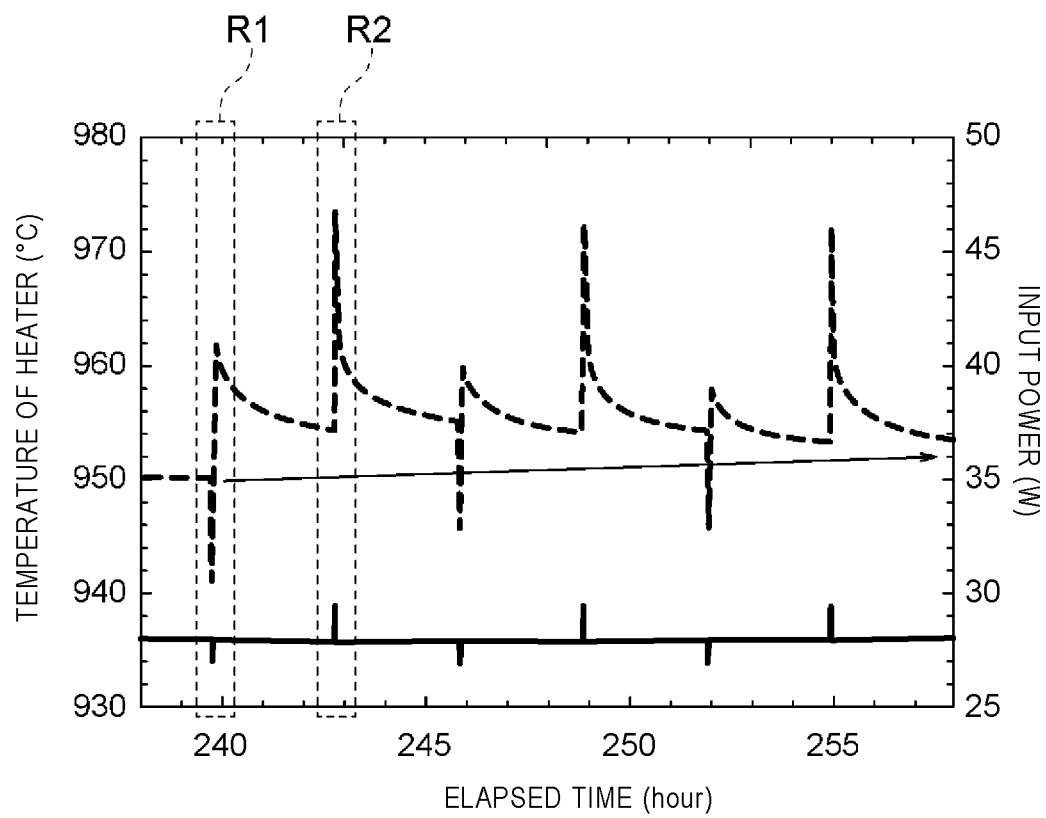
FIG. 18 is a graph showing a relationship between input power and a temperature of a heater in Experiment 5.
Figure 19:
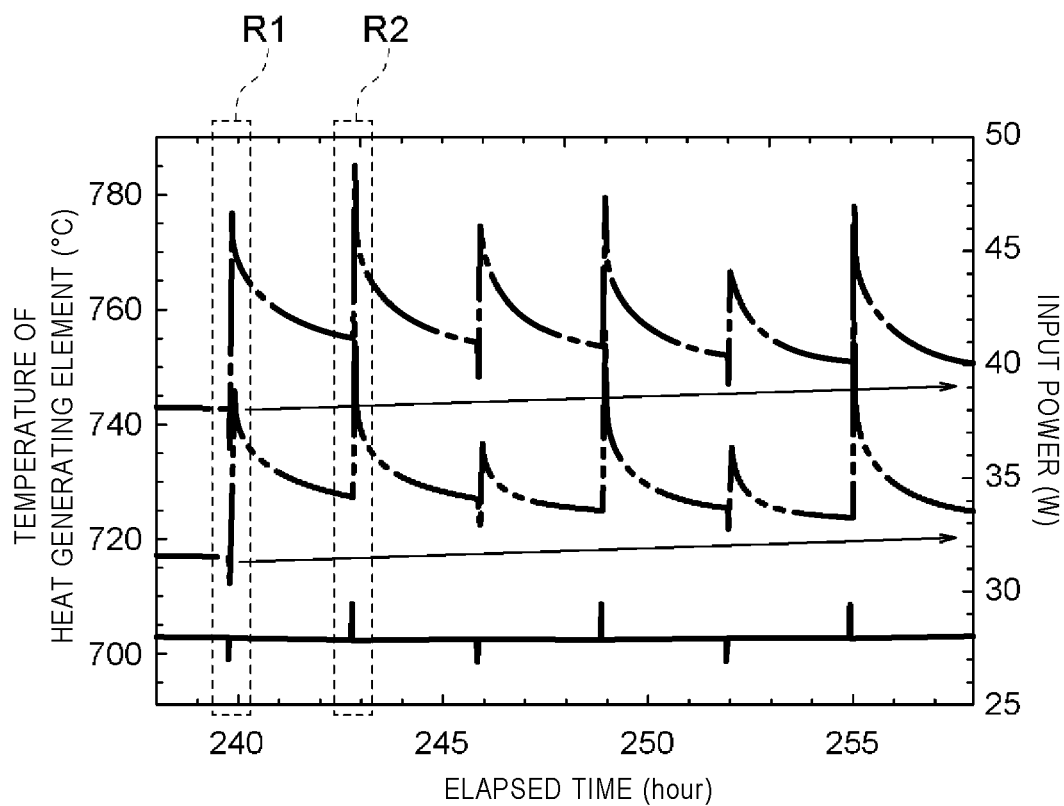
FIG. 19 is a graph showing a relationship between the input power and a surface temperature of a heat generating element in Experiment 5.

Results of Experiment 5 will be described. FIG. 18 is a graph showing a relationship between the input power and the temperature of the heater 52 in Experiment 5. In FIG. 18, a horizontal axis indicates the elapsed time (hour), a first vertical axis on a left side indicates the temperature (° C.) of the heater 52 detected by the thermocouple 61 of the heater 52, and a second vertical axis on a right side indicates the input power (W) applied to the heater 52. The solid line is a graph showing the input power, and the dotted line is a graph showing the temperature of the heater 52. FIG. 19 is a graph showing a relationship between the input power and the surface temperature of the heat generating element 10 in Experiment 5. In FIG. 19, a horizontal axis indicates the elapsed time (hour), a first vertical axis on a left side indicates the surface temperature (° C.) of the heat generating element 10 detected by the temperature sensor 55, and a second vertical axis on a right side indicates the input power (W) applied to the heater 52. The solid line is a graph showing the input power, the dash-dotted line is a graph showing the surface temperature of one heat generating element 10, and the chain double-dashed line is a graph showing the surface temperature of the other heat generating element 10. FIGS. 18 and 19 show experimental results in 20 hours (the specific period), from an elapsed time of 238 hours to an elapsed time of 258 hours, during which the negative perturbation and the positive perturbation are alternately performed three times. A first region R1 in FIGS. 18 and 19 is a region in which the negative perturbation is performed in the vicinity of an elapsed time of 240 hours. A second region R2 in FIGS. 18 and 19 is a region in which the positive perturbation is performed in a vicinity of an elapsed time of 243 hours.

It was confirmed from FIG. 18 that the temperature of the thermocouple 61 gradually increased (see an arrow in FIG. 18) and increased by 3.5° C. in 20 hours from the elapsed time of 238 hours to the elapsed time of 258 hours. In this period, a peak value of the increase in temperature of the thermocouple 61 was 23° C. It was confirmed from FIG. 19 that the surface temperature of each heat generating element 10 gradually increased (see arrows in FIG. 19), and the surface temperature of one heat generating element 10 indicated by the dash-dotted line increased by 7.3° C. and the surface temperature of the other heat generating element 10 indicated by the chain double-dashed line increased by 8.1° C. in 20 hours from the elapsed time of 238 hours to the elapsed time of 258 hours. In this period, a peak value of the increase in surface temperature of the one heat generating element 10 was 44° C., and a peak value of the increase in surface temperature of the other heat generating element 10 was 42.2° C. When comparing the surface temperature of the one heat generating element 10 indicated by the dash-dotted line with the surface temperature of the other heat generating element 10 indicated by the chain double-dashed line, the surface temperature of the one heat generating elements 10 is higher, but this is considered to be due to variations in production of the heat generating elements 10 (for example, a difference in unevenness of the surface). The amount of energy of the excess heat increased by the perturbation was 38,000 J. In the 20 hours (the specific period) from the elapsed time of 238 hours to the elapsed time of 258 hours, since the time average value of the input power by the perturbation is the same value as the reference value Pin, the input power does not substantially increase, but the amount of energy of the excess heat increased.

Figure 20:
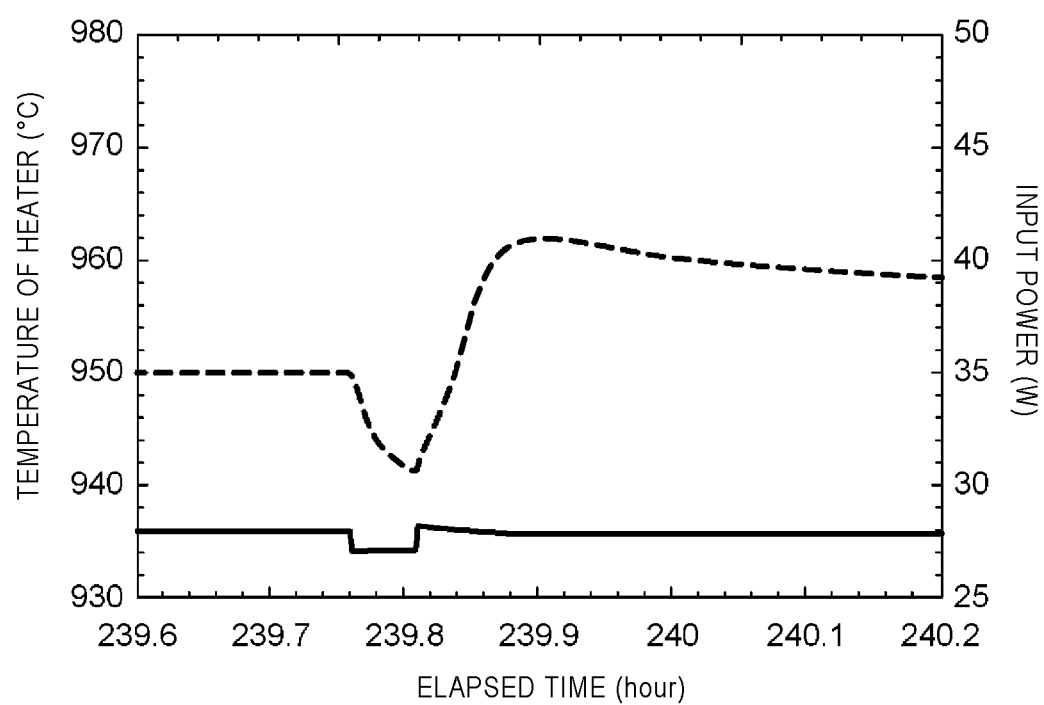
FIG. 20 is a graph showing a first region R1 in FIG. 18 in an enlarged manner.
Figure 21:
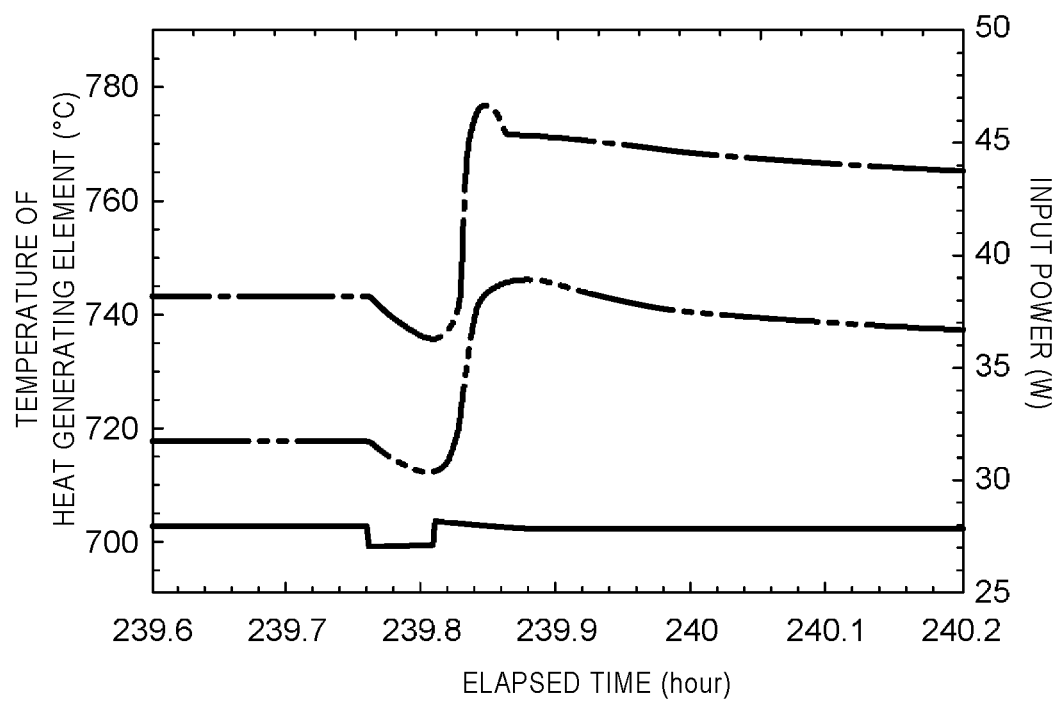
FIG. 21 is a graph showing a first region R1 in FIG. 19 in an enlarged manner.

FIG. 20 is a graph showing the first region R1 in FIG. 18 in an enlarged manner. It was confirmed from FIG. 20 that when comparing the temperatures of the thermocouple 61 before and after the negative perturbation was imparted, the temperature of the thermocouple 61 increased by imparting the negative perturbation. FIG. 21 is a graph showing the first region R1 in FIG. 19 in an enlarged manner. It was confirmed from FIG. 21 that the surface temperatures of the two heat generating elements 10 before and after imparting the negative perturbation increased.

Figure 22:
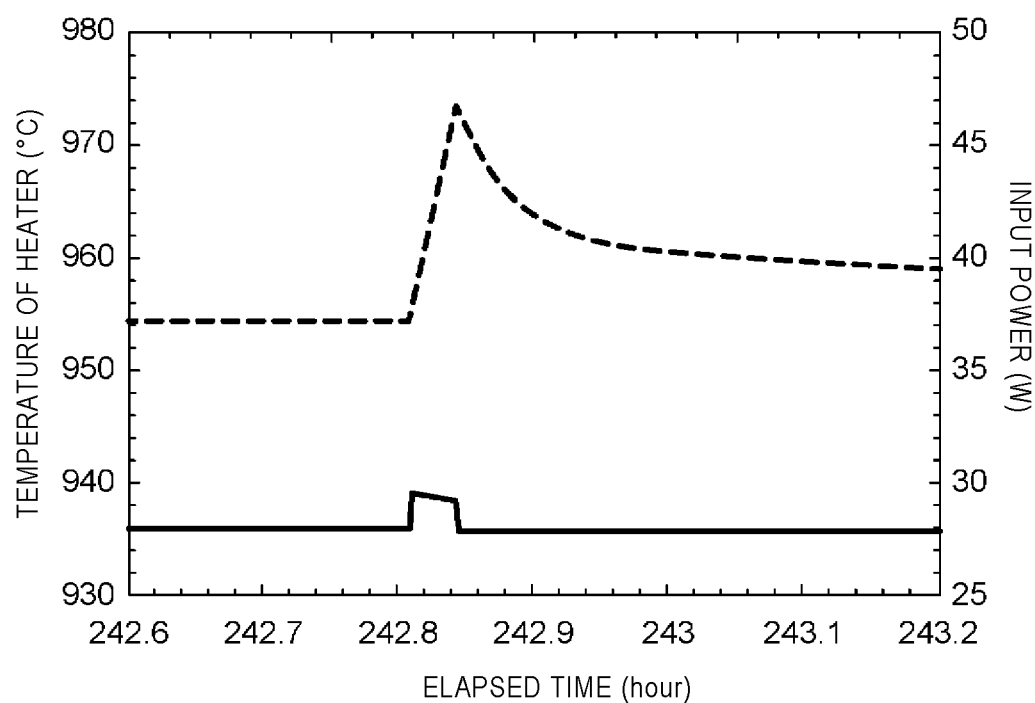
FIG. 22 is a graph showing a second region R2 in FIG. 18 in an enlarged manner.
Figure 23:
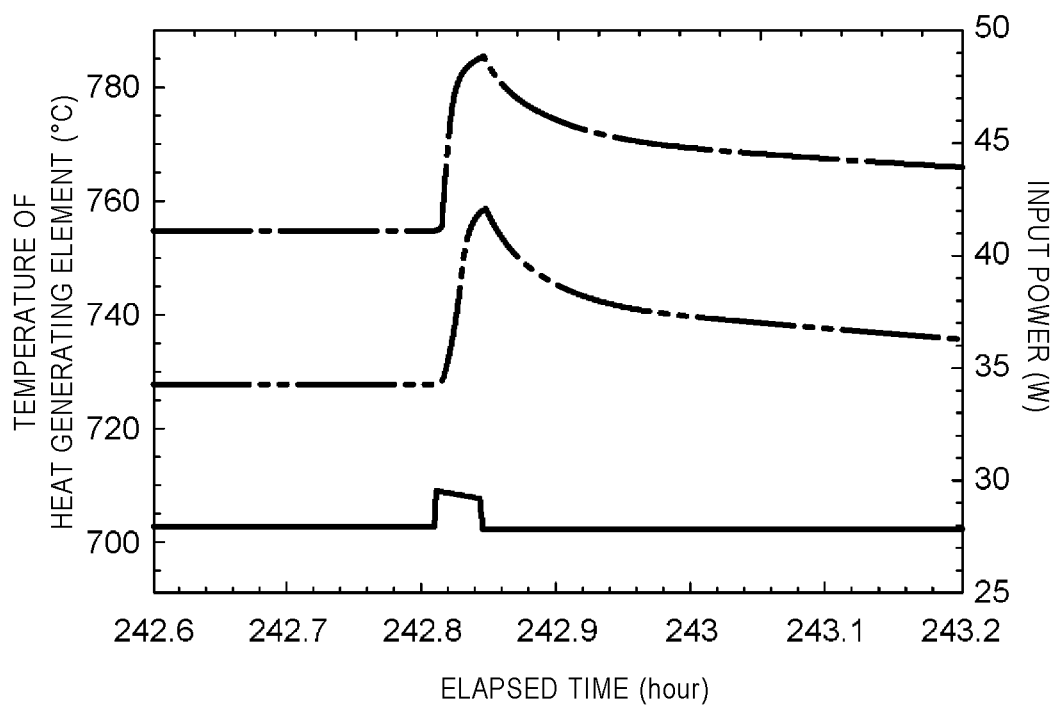
FIG. 23 is a graph showing a second region R2 in FIG. 19 in an enlarged manner.

FIG. 22 is a graph showing the second region R2 in FIG. 18 in an enlarged manner. It was confirmed from FIG. 22 that when comparing the temperatures of the thermocouple 61 before and after the positive perturbation was imparted, the temperature of the thermocouple 61 increased by imparting the positive perturbation. FIG. 23 is a graph showing the second region R2 in FIG. 19 in an enlarged manner. It was confirmed from FIG. 23 that the surface temperatures of the two heat generating elements 10 before and after imparting the positive perturbation increased.

According to Experiment 5, in the batch method, by alternately and repeatedly imparting the negative perturbation and the positive perturbation to the input power to be applied to the heater 52, it is possible to continuously trigger the heat generating reaction of the heat generating element and increase the heat generation amount without applying a large amount of energy to the heat generating element. It is considered that, by alternately repeating the negative perturbation and the positive perturbation, the concentration of hydrogen on the surface of the heat generating element 10 or on the heterogeneous material interface 17 increases, and the second heat generating reaction in which heat is generated with the second heat generation amount larger than the first heat generation amount is continuously triggered, and as a result, the heat generation amount gradually increases.

The heat generated by the heat generating element can be used for various applications. The heat generated by the heat generating element can be recovered using, for example, a heat medium. The heat medium is heated by the heat generating element to a high temperature. The heat medium having a high temperature is used for, for example, household heating, a household water heater, an automobile heater, an agricultural heating machine, a road heater, a seawater desalination heat source, and a geothermal power generation auxiliary heat source. The heat medium may be a gas or a liquid, and preferably has excellent heat conductivity and chemical stability.

Examples of the gas include a helium gas, an argon gas, a hydrogen gas, a nitrogen gas, water vapor, air, and carbon dioxide. Examples of the liquid include water, a molten salt (such as $KNO_3$ (40%) —$NaNO_3$ (60%)), and a liquid metal (such as Pb). Alternatively, the heat medium may be a heat medium having a mixed phase in which solid particles are dispersed in a gas or a liquid. Examples of the solid particles include a metal, a metal compound, an alloy, and ceramics. Examples of the metal include copper, nickel, titanium, and cobalt. Examples of the metal compound include an oxide, a nitride, and a silicide of the above-described metals. Examples of the alloy include stainless steel and chromium molybdenum steel. Examples of the ceramics include alumina. The heat generated by the heat generating element is not limited to being recovered using a heat medium, and the heat generated by the heat generating element may be recovered as electric energy using, for example, a thermoelectric element.

Examples of applications of the heat generated by the heat generating element include a heat exchanger and a power unit. Examples of the heat exchanger include a device that performs heat exchange between a heat medium and a gas, a device that performs heat exchange between a heat medium and a liquid, and a device that performs heat exchange between a heat medium and a solid. The device that performs heat exchange between a heat medium and a gas is used for air conditioning, preheating air to be supplied to a combustion device, generation of hot air for drying and hot air for heating, and the like. Examples of the combustion device include a boiler, a rotary kiln, a metal heat treatment furnace, a heating furnace for metal processing, a hot air furnace, a firing furnace for ceramics, a petroleum refining tower, a dry distillation furnace, and a drying furnace. The device that performs heat exchange between a heat medium and a liquid is used for a heat source of a boiler, oil heating, a chemical reaction tank, and the like. The device that performs heat exchange between a heat medium and a solid is used for a double-pipe rotary heater or heating of a particulate matter in a double pipe. Examples of the power unit include a gas turbine, a steam turbine, a Stirling engine, and an organic rankine cycle system (OROS).

REFERENCE SIGN LIST 10, 20, 30: heat generating element
11: base
12, 22, 32: multilayer film
14: first layer
15: second layer
24: third layer
34: fourth layer
17, 27, 37: heterogeneous material interface
41: heat generating step
42: trigger step
50, 80: heat generating device
51, 83: container
52, 84: heater
53, 85: gas introduction unit
54, 86: gas discharge unit
55, 87: temperature sensor
81: first chamber
82: second chamber

The invention claimed is:

1. A heat generating method comprising:
heating, with a heater, a heat generating element and causing a first heat generating reaction in which the heat generating element generates heat with a first heat generation amount,
wherein the heat generating element including:
a base made of a hydrogen storage metal, a hydrogen storage alloy, or a proton conductor, and
a multilayer film provided on a surface of the base,
wherein the multilayer film having a stacked configuration including; a first layer made of a hydrogen storage metal or a hydrogen storage alloy and having a thickness of less than 1,000 nm, and a second layer made of a hydrogen storage metal or a hydrogen storage alloy, which is different from that of the first layer, or ceramics and having a thickness of less than 1,000 nm;
triggering a second heat generating reaction in which the heat generating element generates heat with a second heat generation amount larger than the first heat generation amount, by imparting a perturbation to an input power to be applied to the heater in a state where the first heat generating reaction is occurring.

2. The heat generating method according to claim 1, wherein
in the triggering, a surface temperature of the heat generating element varies due to the perturbation.

3. The heat generating method according to claim 1, wherein
the perturbation is imparted by decreasing and then increasing the input power.

4. The heat generating method according to claim 1, wherein
the perturbation is imparted by increasing and then decreasing the input power.

5. The heat generating method according to claim 1, wherein
the perturbation is repeatedly performed in the triggering after a lapse of a predetermined time.

6. The heat generating method according to claim 5, wherein
the perturbation includes a first perturbation in which the input power is decreased and then increased, and a second perturbation in which the input power is increased and then decreased, and
the first perturbation and the second perturbation are alternately repeated in the triggering.

7. The heat generating method according to claim 1, wherein
the heat generating element generates heat in a process in which hydrogen permeates or diffuses, in a manner of quantum diffusion, through a heterogeneous material interface which is an interface between the first layer and the second layer.

* * * * *

UNITED STATES PATENT AND TRADEMARK OFFICE
CERTIFICATE OF CORRECTION

PATENT NO. : 12,247,766 B2
APPLICATION NO. : 18/000126
DATED : March 11, 2025
INVENTOR(S) : Yasuhiro Iwamura et al.

It is certified that error appears in the above-identified patent and that said Letters Patent is hereby corrected as shown below:

In the Claims

At Column 22, Claim number 1, Line number 17, "1,000 nm;" should read -- 1,000 nm; and --.

Signed and Sealed this
Sixth Day of May, 2025

Coke Morgan Stewart
*Acting Director of the United States Patent and Trademark Office*